(12) United States Patent
Blanchard

(10) Patent No.: US 8,251,606 B2
(45) Date of Patent: Aug. 28, 2012

(54) FASTENER AND ASSEMBLY UTILIZING THE SAME

(75) Inventor: Bradley V. Blanchard, Lake Orion, MI (US)

(73) Assignee: The Blanchard Patent Holding Company, LLC, Detroit, MI (US)

( * ) Notice: Subject to any disclaimer, the term of this patent is extended or adjusted under 35 U.S.C. 154(b) by 469 days.

(21) Appl. No.: 12/511,724

(22) Filed: Jul. 29, 2009

(65) Prior Publication Data
US 2009/0290931 A1 Nov. 26, 2009

Related U.S. Application Data

(63) Continuation-in-part of application No. 11/848,917, filed on Aug. 31, 2007, now Pat. No. 7,762,739.

(51) Int. Cl.
*B25G 3/18* (2006.01)
(52) U.S. Cl. .......... 403/322.2; 403/322.3; 403/325; 294/57
(58) Field of Classification Search .............. 403/322.1, 403/322.2, 322.3, 325; 16/422, 426; 294/51, 294/52, 57, 58
See application file for complete search history.

(56) References Cited

U.S. PATENT DOCUMENTS

| | | |
|---|---|---|
| 1,054,126 A | 2/1913 | Lindberg |
| 1,353,299 A | 9/1920 | Wilson |
| 1,468,732 A | 9/1923 | Bradbury |
| 2,255,695 A * | 9/1941 | Bull .................. 294/82.28 |
| 2,452,430 A | 10/1948 | Clark et al. |
| 2,461,699 A | 2/1949 | Scheiwer |
| 2,674,469 A | 4/1954 | Earle et al. |
| 2,695,071 A | 11/1954 | Hupp |
| 2,864,293 A | 12/1958 | Edrich et al. |
| 2,975,839 A | 3/1961 | Burrows et al. |
| 3,040,590 A | 6/1962 | Smithburn |
| 3,112,767 A | 12/1963 | Cator |

(Continued)

FOREIGN PATENT DOCUMENTS
WO   WO-2009027734 A2   3/2009

OTHER PUBLICATIONS

International Search Report PCT/US2010/043637 dated Apr. 15, 2011.

*Primary Examiner* — Michael P Ferguson
(74) *Attorney, Agent, or Firm* — Honigman Miller Schwartz and Cohn LLP

(57) ABSTRACT

A fastener is disclosed. The fastener includes a housing, wherein the housing forms a housing cavity, wherein the housing cavity includes at least one recess; a cage at least partially disposed in said housing cavity, wherein an outer surface of the cage is spaced apart from an inner surface of the housing that forms the housing cavity, wherein the cage defines a cage cavity, and a plurality of passages aligned with said at least one recess; a plurality of retaining members at least partially retained within said plurality of passages; and a plunger at least partially disposed in said cage cavity, wherein said plunger is at least partially movable within said cage cavity between a first position to cause said one or more retaining members to be displaced radially outwardly thereby mechanically coupling said housing to said cage, and a second position to allow said one or more retaining members to be displaced radially inwardly thereby allowing said housing to be uncoupled from said cage.

13 Claims, 15 Drawing Sheets

U.S. PATENT DOCUMENTS

| | | |
|---|---|---|
| 3,302,960 A | 2/1967 | Herrmann |
| 3,317,220 A | 5/1967 | Bruning |
| 3,436,086 A | 4/1969 | Glenzer |
| 3,469,871 A | 9/1969 | Betts |
| 3,521,895 A | 7/1970 | Smith |
| 3,603,162 A | 9/1971 | Gohler et al. |
| 3,650,578 A | 3/1972 | DelVecchio et al. |
| 3,744,569 A | 7/1973 | Ehrlich |
| 3,809,121 A | 5/1974 | Harris |
| 3,817,560 A | 6/1974 | Guertin |
| 3,822,951 A | 7/1974 | Bornzin |
| 3,888,559 A | 6/1975 | Geib |
| 3,929,343 A | 12/1975 | Wanner et al. |
| 4,014,467 A | 3/1977 | Ferguson |
| 4,016,914 A * | 4/1977 | Zurko ............... 411/105 |
| 4,111,477 A * | 9/1978 | Rigali ............... 292/252 |
| 4,120,232 A * | 10/1978 | Hoffman, Jr. ....... 294/82.26 |
| 4,366,945 A | 1/1983 | Blauenstein et al. |
| 4,437,647 A | 3/1984 | Cruse |
| 4,453,449 A | 6/1984 | Hollmann |
| 4,546,956 A | 10/1985 | Moberg et al. |
| 4,597,203 A | 7/1986 | Middleton |
| 4,616,952 A | 10/1986 | Schott et al. |
| 4,642,976 A | 2/1987 | Owens |
| 4,643,472 A * | 2/1987 | Schukei et al. ........ 403/322.2 |
| 4,709,454 A | 12/1987 | Barnes et al. |
| 4,749,301 A | 6/1988 | Suzuki et al. |
| 4,803,831 A | 2/1989 | Carmine |
| 4,813,810 A | 3/1989 | Suzuki et al. |
| 4,815,495 A | 3/1989 | Remsburg |
| 4,938,622 A | 7/1990 | Stoerzbach |
| 4,941,862 A | 7/1990 | Hazebrook et al. |
| 4,960,344 A | 10/1990 | Geisthoff et al. |
| 4,978,150 A | 12/1990 | Schoot |
| 5,013,194 A | 5/1991 | Wienhold |
| 5,066,049 A | 11/1991 | Staples |
| 5,076,324 A | 12/1991 | Herman et al. |
| 5,083,818 A | 1/1992 | Schoot |
| 5,251,428 A | 10/1993 | Gay |
| 5,255,714 A | 10/1993 | Mullins |
| 5,265,970 A | 11/1993 | LaBarre |
| 5,312,084 A | 5/1994 | Weh et al. |
| 5,335,947 A | 8/1994 | Remsburg |
| 5,366,313 A | 11/1994 | LaBarre |
| 5,464,229 A | 11/1995 | Salpaka |
| 5,471,899 A | 12/1995 | Twomlow |
| 5,474,024 A | 12/1995 | Hallock |
| 5,520,253 A | 5/1996 | Kesting |
| 5,573,255 A | 11/1996 | Salpaka |
| 5,603,353 A | 2/1997 | Clark et al. |
| 5,692,851 A | 12/1997 | Pace |
| 5,787,693 A | 8/1998 | Dyke et al. |
| 5,816,633 A * | 10/1998 | Odom ............... 294/51 |
| 5,826,414 A | 10/1998 | Lenczuk |
| 5,896,931 A | 4/1999 | Roberts et al. |
| 6,224,522 B1 | 5/2001 | Ervin |
| 6,331,091 B2 | 12/2001 | Cross |
| 6,439,797 B1 | 8/2002 | Campbell |
| 6,561,523 B1 | 5/2003 | Wienhold |
| 6,643,959 B2 | 11/2003 | Jolliff et al. |
| 6,675,562 B2 | 1/2004 | Lawrence |
| 6,761,519 B2 | 7/2004 | Alderman |
| 6,922,981 B1 | 8/2005 | Tyree |
| 6,941,739 B1 | 9/2005 | Gliser |
| 7,574,768 B2 * | 8/2009 | Morris et al. ........... 403/322.2 |
| 2001/0009632 A1 | 7/2001 | Cross |
| 2009/0060644 A1 | 3/2009 | Blanchard |

\* cited by examiner

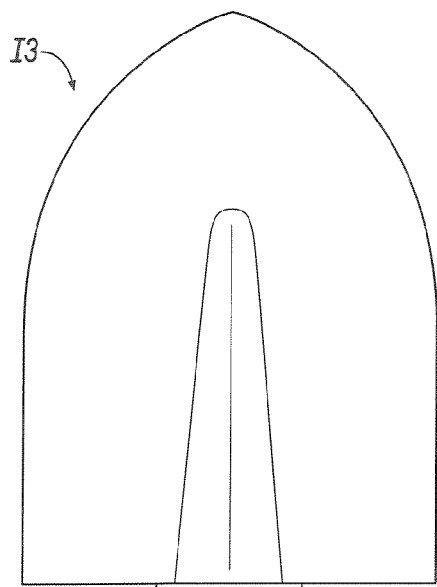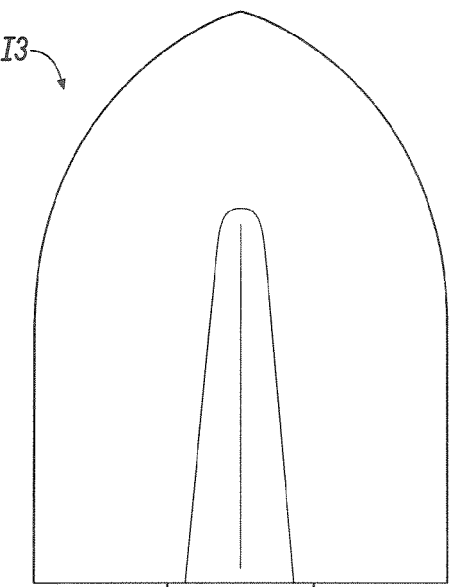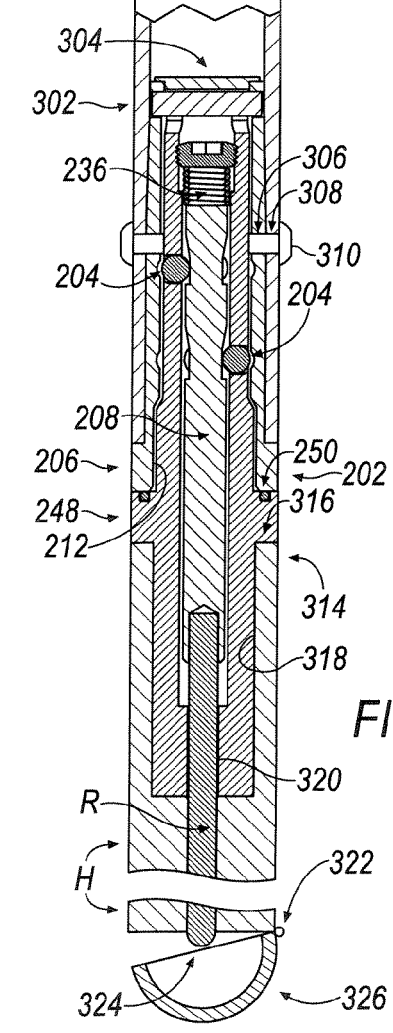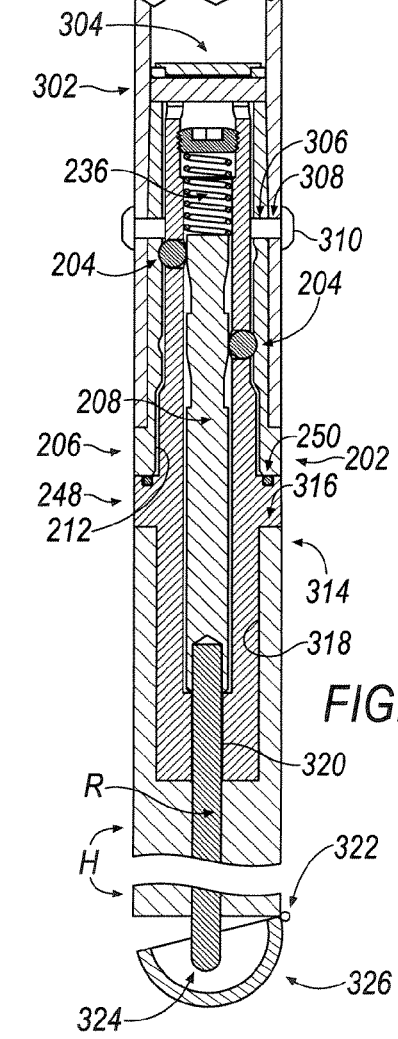
FIG. 14C  FIG. 14D

FASTENER AND ASSEMBLY UTILIZING THE SAME

RELATED APPLICATION

The disclosure is a continuation-in-part of application Ser. No. 11/848,917 filed on Aug. 31, 2007, now U.S. Pat. No. 7,762,739 issued on Jul. 27, 2010, the contents of which are incorporated herein by reference.

FIELD OF THE INVENTION

The disclosure relates to fasteners and more particularly relates to quick disconnect fasteners and to an assembly utilizing the same.

DESCRIPTION OF THE RELATED ART

Fasteners are known in the art and are typically utilized for joining two or more articles together. Conventional fasteners may include, for example, screws, bolts and nuts (i.e., more commonly generically referred to in the art as a 'threaded fastener'), VELCRO® (i.e., more commonly referred to in the art as a 'hook and loop fastener'), or other, more complex mechanical devices and linkages.

Although adequate for most applications, there is a need in the art for an improved fastener that permits a user to quickly and conveniently join and then disconnect two or more articles.

BRIEF DESCRIPTION OF THE DRAWINGS

The disclosure will now be described, by way of example, with reference to the accompanying drawings, in which:

FIG. 14C illustrates the selected implement arranged about the handle body with the fastener arranged in a first, unlatched orientation; and FIG. 14D illustrates the selected implement arranged about the handle body with the fastener arranged in a second, latched orientation for affixing the selected implement to the handle body.

DETAILED DESCRIPTION OF THE INVENTION

The Figures illustrate exemplary embodiments of a fastener and assembly utilizing the same in accordance with an embodiment of the invention. Based on the foregoing, it is to be generally understood that the nomenclature used herein is simply for convenience and the terms used to describe the invention should be given the broadest meaning by one of ordinary skill in the art.

Figure 1:
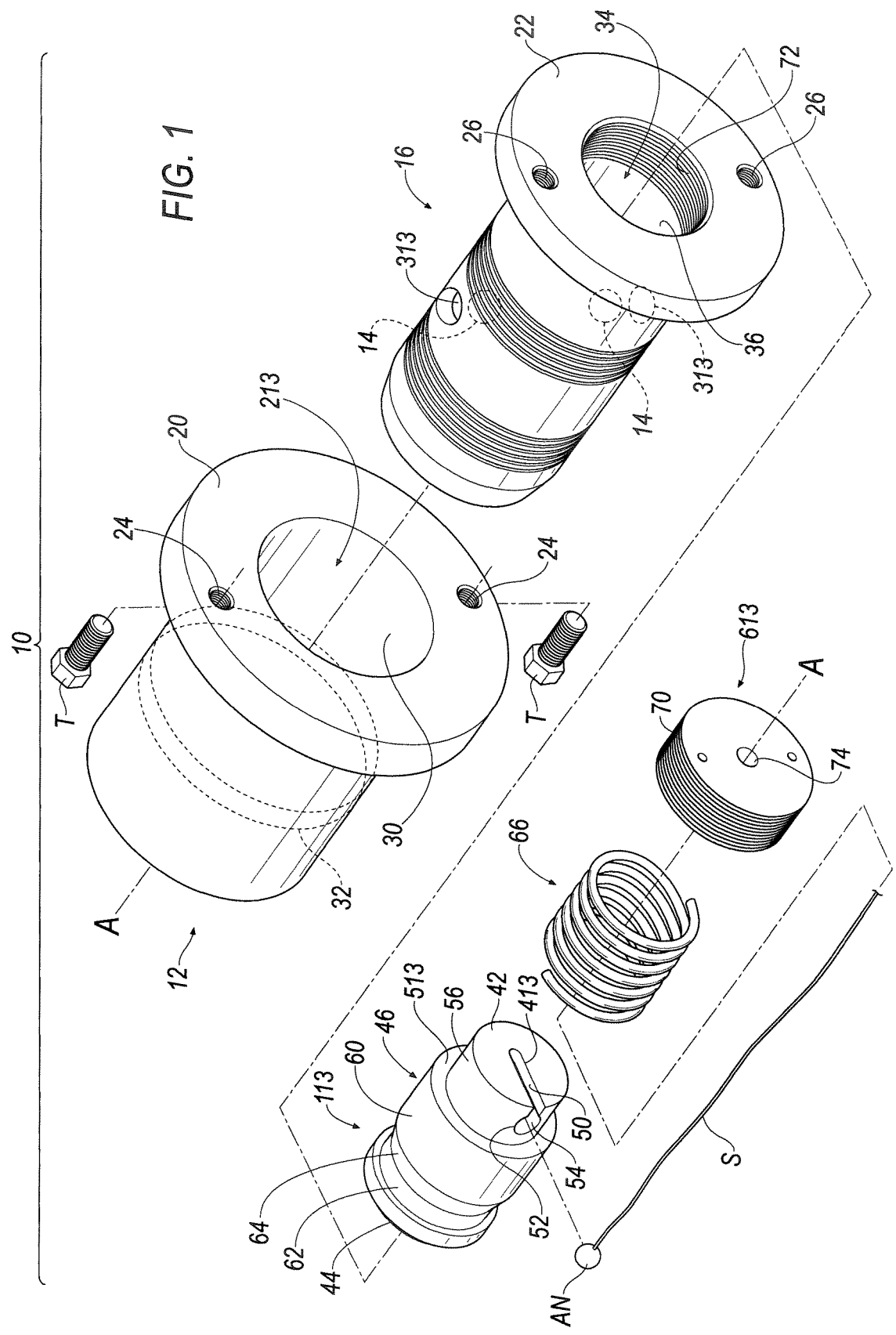
FIG. 1 is an exploded isometric view of a fastener in accordance with an exemplary embodiment of the invention.
Figure 2A:
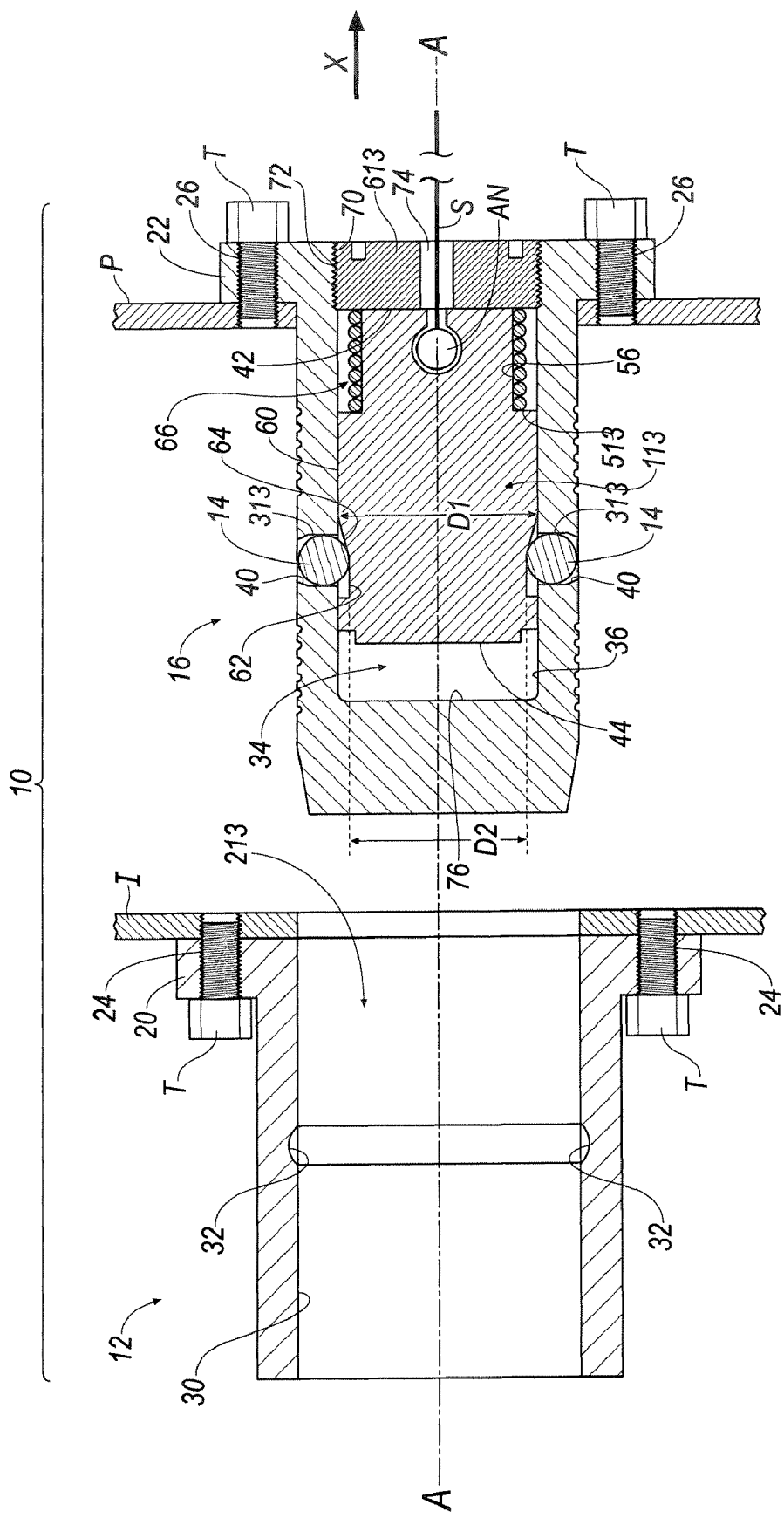
FIG. 2A is cross-sectional view of the fastener of FIG. 1 in a disconnected fully disengaged state in accordance with an exemplary embodiment of the invention.
Figures 2B, 2C:
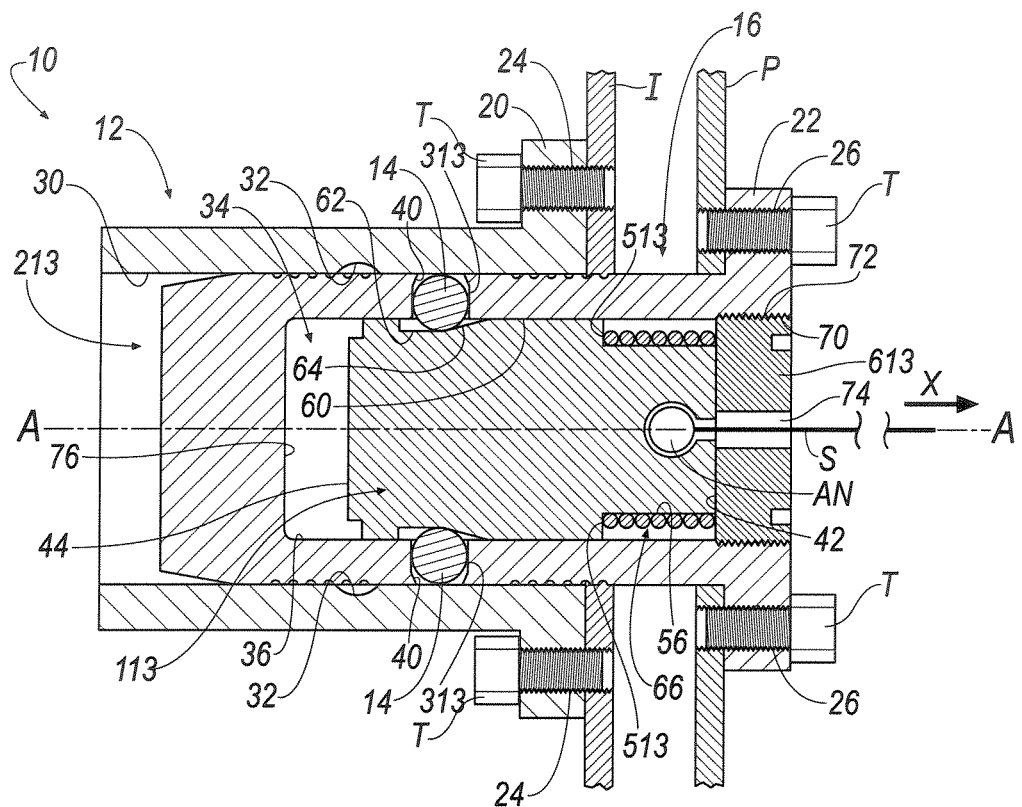
FIG. 2B is another cross sectional view of the fastener of FIG. 1 in a disconnected, partially disengaged state in accordance with an exemplary embodiment of the invention.
FIG. 2C is a cross-sectional view of the fastener of FIG. 1 in a connected, fully engaged state in accordance with an exemplary embodiment of the invention.

Referring to FIGS. 1-2C, a fastener is shown generally at 10 according to an embodiment. In an embodiment, the fastener 10 generally includes, for example, a housing 12, one or more retaining members 14, such as for example generally spherical retaining members 14, a cage 16, and a plunger 18. As will be explained in greater detail below, axial movement of the plunger 18 along a longitudinal axis, A-A, results in radial movement of the retaining members 14 relative the axis, A-A, to effect interlocking (see, e.g., FIG. 2C) or unlocking (see, e.g., FIG. 2B) of the housing 12 and cage 16.

In an embodiment, the housing 12 may be attached to an implement, I (FIGS. 2A-2C, 4A-5B). In an embodiment, the cage 16 may be attached to a power unit, P (FIGS. 2A-2C, 4A-5B). However, it will be appreciated that, in an embodiment, the reverse condition may occur in that the housing 12 is attached to the power unit, P, and the ball cage may be attached to the implement, I.

According to an embodiment, the housing 12/cage 16 assembly may be attached to the implement, I/power unit, P, by any desirable fastening method, such as, for example, welding or by a threaded fastener, T. As seen in FIGS. 1-2C, the housing 12 may include an annular end portion 20, and the cage 16 may also include an annular end portion 22 each having respective threaded passages 24, 26 for receiving a threaded fastener, T. Although threaded fasteners, T, are disclosed, it will be appreciated that other fasteners, such as, for example, rivets, welds, or the like may be utilized to attach the housing 12/cage 16 to the implement, I/power unit, P.

Referring to FIG. 1, the housing 12 may include a cavity 28 for receiving at least a portion of the cage 16. The housing cavity 28 is generally defined by a substantially cylindrical bore having a surface 30. As seen in FIG. 2A, the surface 30 is defined to include a recess 32 (which may be a single bore, a series of spaced bores, or a continuous annular recess) for partially receiving the one or more retaining members 14. Although FIGS. 1-3B depict two retaining members (spaced 180° apart from one another), it is contemplated that one or more retaining members could be used. For example, the use of three equally spaced retaining members 14 (i.e. spaced 120° apart) has the advantage of the minimum number of retaining members 14, that permit plunger 18 to be centered within cavity 28.

Referring to FIG. 1, the cage 16 may further include a cavity 34 for receiving at least a portion of the plunger 18. The cavity 34 is hereinafter referred to as a cage cavity 34. In an embodiment, the cage cavity 34 may be generally defined by a substantially cylindrical bore having a surface 36.

In an embodiment, the cage 16 may further include one or more passages, which are shown generally at 38, for partially receiving the one or more retaining members 14. Retaining members 14 are depicted as spherical members (e.g. steel ball bearings) but it is contemplated that other geometries (such as pins, etc.) will function equally as well. Passages 38 may include at least in part a radial passage component. In an embodiment, as seen in FIGS. 2A-2C, one or more passages 38 may include retaining portions, which are shown generally at 40, for partially retaining the one or more retaining members 14 proximate the one or more passages 38 when the cage 16 is removed from the housing cavity 28. Other means for retaining the retaining members 14 within cage 16 are well known to those skilled in the art.

Referring to FIG. 1, the plunger 18 may include a substantially cylindrical body that is sized to be at least partially disposed within the cage cavity 34. In an embodiment, the plunger 18 may include a first axial end 42, a second axial end 44, and a side surface 46 between the first axial end 42 and the second axial end 44.

The first axial end 42 may further include a first opening 48 that extends from the side surface 46 to approximately a central area of the first end 42 where a central axis, A-A, of the fastener 10 would otherwise traverse or extend there-through. The first opening 48 defines a passage 50 formed in the plunger 18 in the shape of, according to an embodiment, a slit that permits axial passage of a cable, thread, string, or the like, which is shown generally at S.

Referring to FIG. 1, the plunger 18 includes a second opening 52 formed in the side surface 46 that defines a passage 54 formed in the plunger 18 for permitting passage of an anchor, AN, attached to an end of the cable, S. Passage 54 may have, at least in part, a radial component, and passage 50 may have, in part, an axial component. In an embodiment, the axial passage 50 and radial passage 54 are in fluid communication with one another such that upon disposing the anchor, AN, in the radial passage 54, the cable, S, extending from the anchor, AN, may axially extend from the plunger 18 and through the axial passage 50. Other means of attaching a cable to a member are well-known to those skilled in the art (such as crimping, gluing, threading, etc.) and do not necessarily require an anchor AN.

Referring to FIGS. 1-2C, the side surface 46 of the plunger 18 is defined to include several surfaces 56-64. In an embodiment, the side surface 46 may include a neck surface portion 56 for locating and retaining an urging member 66 and a shoulder surface portion 58 for forming a reaction surface for urging member 66. A portion of urging member 66 may urge against surface 58. Urging member 66 may be any known urging device, such as a coil spring, gas charged cylinder, compressible body (such as rubber) or the like. If member 66 is a coil spring, the coils of the spring member 66 can be concentrically disposed about the neck surface portion 56 whereas the shoulder surface portion 58 can provide a seating surface for an end coil of the spring member 66.

The side surface 46 of the plunger 18 may further include a first retaining member engagement surface 60. In an embodiment, the first retaining member engagement surface 60 defines an axial segment of the plunger 18 to include a first diameter, D1 (see, e.g. FIG. 2A). The first retaining member engagement surface 60 may, in an embodiment, contact the surface 36 of the cage cavity 34, or, in an embodiment, is positioned substantially close to the surface 36 of the cage cavity 34 when the plunger 18 is disposed in the cage 16.

The side surface 46 of the plunger 18 may further include a second retaining member engagement surface 62. In an embodiment, the second retaining member engagement surface 62 defines an axial segment of the plunger 18 to include a second diameter, D2 (see, e.g., FIG. 2A), that is less than the first diameter, D1.

The side surface 46 of the plunger 18 may further include an intermediate retaining member engagement surface 64 located between the first retaining member engagement surface 60 and the second retaining member engagement surface 62. The intermediate retaining member engagement surface 64 does not define an axially parallel segment of the plunger 18 to include a constant diameter (as related to, for example, diameters D1, D2), but rather, defines a sloped or ramped surface (e.g. a frusto-conical surface).

Although the plunger 18 is described to include retaining member engagement surfaces 60-64 having constant and non-constant diameter axial segments, it will be appreciated that the plunger 18 is not limited to the configurations disclosed above. For example, in an embodiment, the intermediate retaining member engagement surface 64 is not limited to define the plunger 18 having a frusto-conical axial segment; for example, in an alternative embodiment, the intermediate retaining member engagement surface 64 may define the plunger 18 to have a non-conical axial segment, such as, for example a concave or convex segment.

Referring to FIG. 1, the fastener 10 may include a plug member 68. Plug member 68 may be at least partially disposed in the cage cavity 34. Plug member 68 may form a reaction surface for the urging member 66. In an embodiment, the plug member 68 may include an outer threaded surface 70 that threadingly-cooperates with a threaded surface 72 formed in the surface 36 of the cage cavity 34. The plug member 68 also includes an axial passage 74 that permits axial passage of the cable, S.

Upon disposing the retaining members 14, plunger 18, urging member 66 and plug member 68 in the cage 16, radial movement of the one or more retaining members 14 may be provided by axially moving the plunger 18 within the cage cavity 34. In an embodiment, the one or more retaining members 14 that are radially retained by the cage 16 will contact, at any given time, at least one of the first, second, and intermediate retaining member engagement surfaces 60-64, and, because of the differences in diameter and the frusto-conical shape of the axial segment of the plunger 18 as defined by the surfaces 60-64, the one or more retaining members 14 may be radially displaced according to the particular surface 60-64 that the one or more retaining members 14 is in contact with.

For example, when the cable, S, is pulled in the direction of arrow, X (see, e.g., FIG. 2A), the first end 42 of the plunger 18 is positioned substantially adjacent the plug member 68 such that the urging member 66 is compressed and one or more retaining members 14 are no longer biased radially outwardly and they are free to move radially inwardly to contact the second retaining member engagement surface 62. Because the second retaining member engagement surface 62 has a diameter, D2, that is less than the diameter, D1, the one or more retaining members 14 will be radially inwardly displaced when cage 16 is withdrawn from cavity 28 of housing 12.

In another example, when the cable, S, is released, the urging member 66 causes the plunger 18 to move axially away from the plug member 68 in a direction of arrow X' (opposite the arrow X) such that the one or more retaining members 14 contacts and rides radially outwardly along the intermediate retaining member engagement surface 64. Accordingly, because the intermediate retaining member engagement surface 64 includes larger diameters at each axial segment of the surface 64 than that of diameter, D2, the one or more retaining members 14 are radially displaced outwardly (away from the axis, A-A).

Now referring to FIG. 2C, as the urging member 66 causes the plunger 18 to move even further away from the plug member 68, the second end 44 of the plunger 18 contacts a bottom surface 76 of the cage cavity 34 such that the one or more retaining members 14 may then contact the first retaining member engagement surface 60 of plunger 18. Because the retaining member engagement surface 60 includes a larger diameter, D1, than that of the second and intermediate retaining member engagement surfaces 62, 64, the one or more retaining members 14 may be biased radially outwardly further from the axis, A-A, than that when the one or more retaining members 14 contact the second or intermediate surfaces 62, 64.

As seen in FIG. 2C, when the cage 16 having the one or more retaining members 14, plunger 18, and plug member 68 is disposed in the housing cavity 28, the one or more retaining members 14 may be radially aligned with the recess 32 formed in the surface 30 of the housing cavity 28. Thus, when the plunger 18 is axially moved as described above, the radial displacement of the one or more retaining members 14 may permit the one or more retaining members 14 to be in selective radial communication with the recess 32.

For example, when the one or more retaining members 14 contact the first engagement surface 60 of the plunger 18, the one or more retaining members 14 may be displaced radially outwardly relative the axis, A-A, to engage the recess 32 and thereby come into contact with the housing 12. Because the one or more retaining members 14 is/are generally disposed in the one or more radial passages 38 of the cage 16, and, because the one or more retaining members 14 may at least partially engage the recess 32 to thereby contact housing 12, the end result of the radially outward positioning of the one or more retaining members 14 relative the housing 12 and cage 16 results in the locking/coupling of the housing 12 and the cage 16. Conversely, when the one or more retaining members 14 contact the second engagement surface 62 of the plunger 18 (see, e.g., FIGS. 2A and 2B), the one or more retaining members 14 are free to be displaced radially inwardly relative the axis, A-A; accordingly, when the one or more retaining members 14 are displaced radially inwardly, the one or more retaining members 14 are disengaged from the recess 32, and, as a result, no longer contact the housing 12 to result in the unlocking/uncoupling of the housing 12 and cage 16. Thus, the axial movement of the plunger 18 that translates into radial movement of the one or more retaining members 14 relative the axis, A-A, results in the quick and convenient connecting and disconnecting of articles (e.g. the implement, I, and power unit, P) that the housing 12 and cage 16 are attached to by way of, for example, threaded fasteners, T.

Figure 3A:
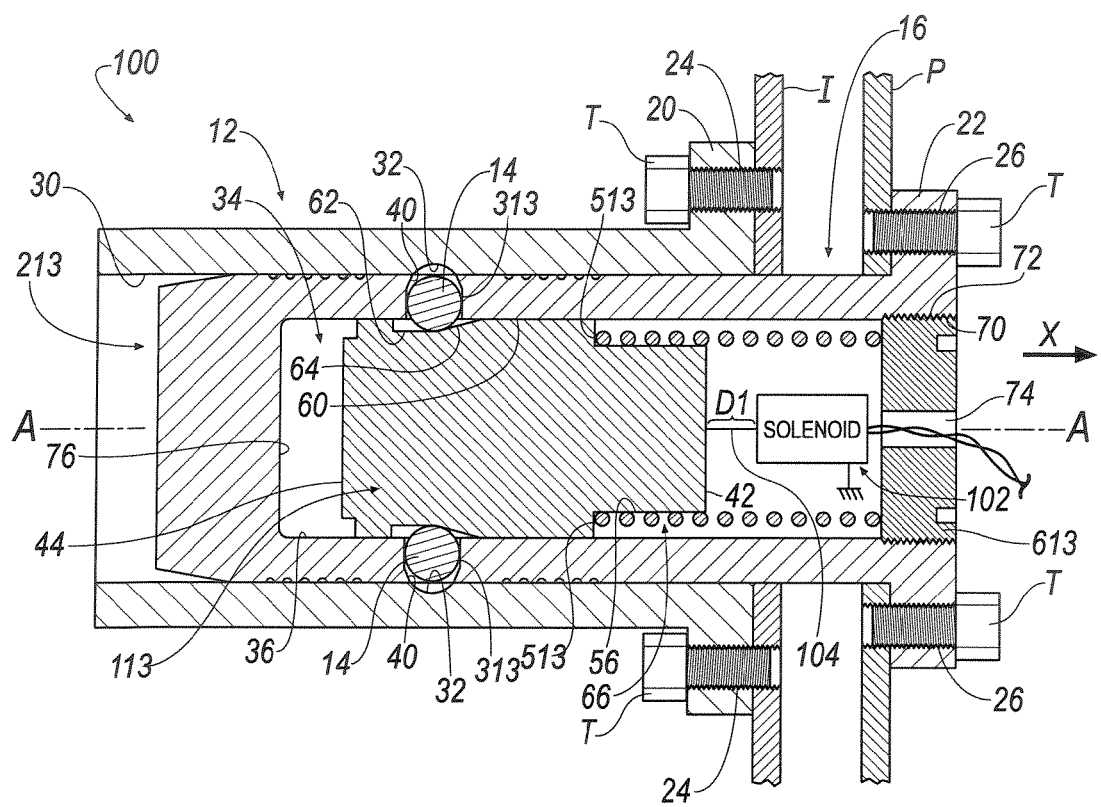
FIG. 3A is a cross-sectional view of a fastener in a disconnected state in accordance with an exemplary embodiment of the invention.
Figure 3B:
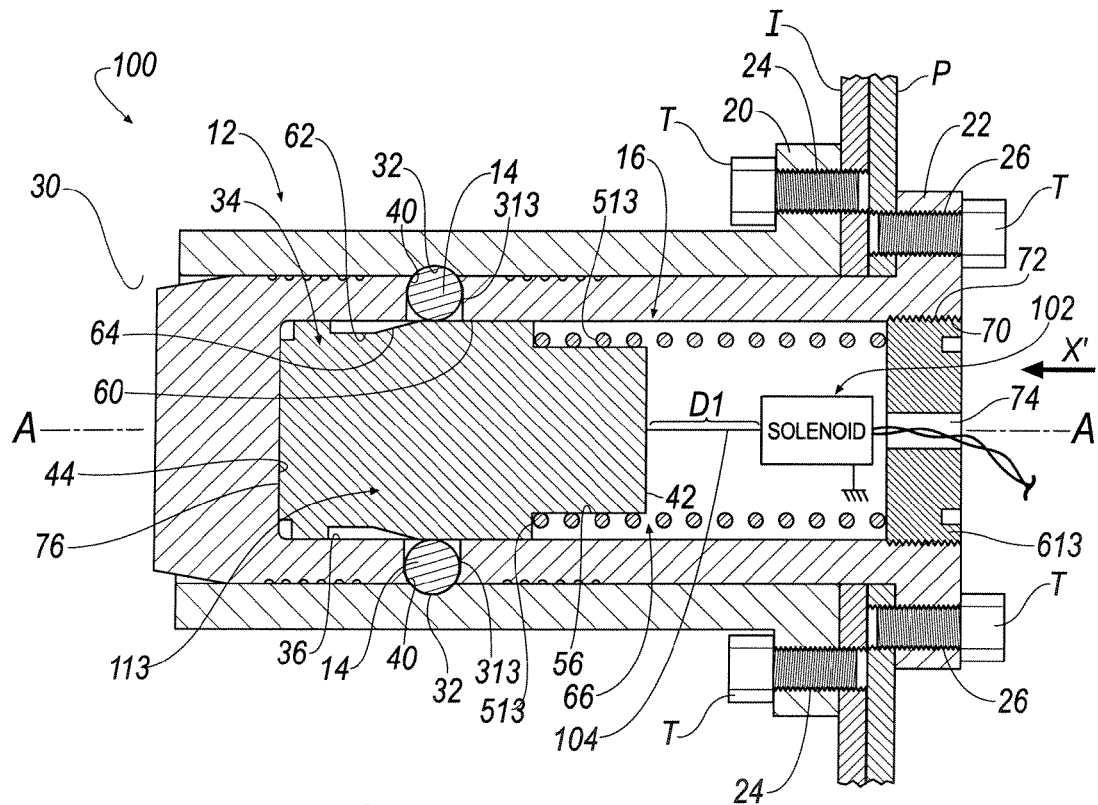
FIG. 3B is a cross-sectional view of a fastener in a connected state in accordance with an exemplary embodiment of the invention.

Referring to FIGS. 3A and 3B, a fastener is shown generally at 100 according to an embodiment. The fastener 100 is substantially similar to the fastener 10 with the exception of a solenoid driving mechanism 102 that replaces the cable, S, and anchor, AN. As illustrated, when electrical current is applied to the solenoid 102, a mechanical coupling 104 extending from the solenoid 102 draws the plunger 18 axially toward the plug member 68 (see, e.g., FIG. 3A). Conversely, when no electrical current is applied to the solenoid 102, the urging member 66 axially moves the plunger 18 toward the bottom surface 76 of the cage cavity 34 (see, e.g., FIG. 3B).

Figure 4A:
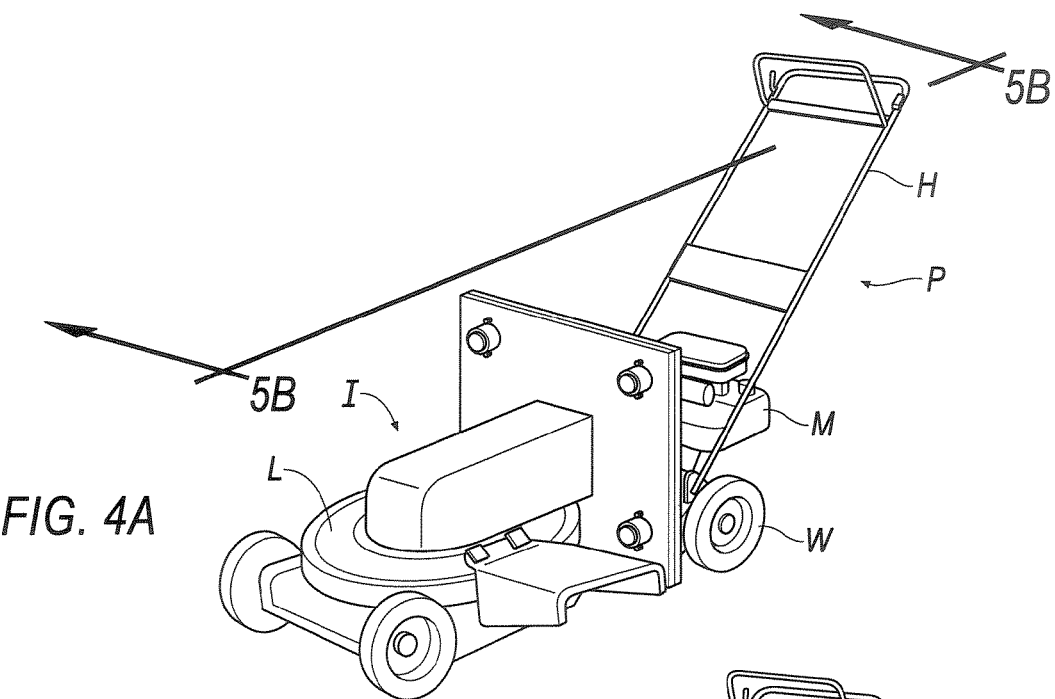
FIG. 4A is an isometric view of an assembly joined by way of a fastener in accordance with an exemplary embodiment of the invention.
Figure 4B:
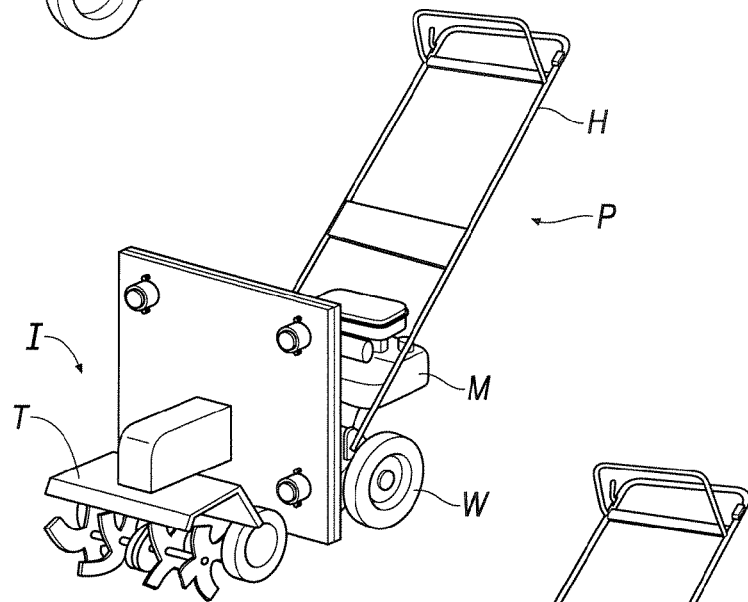
FIG. 4B is an isometric view of an assembly joined by way of a fastener in accordance with an exemplary embodiment of the invention.
Figure 4C:
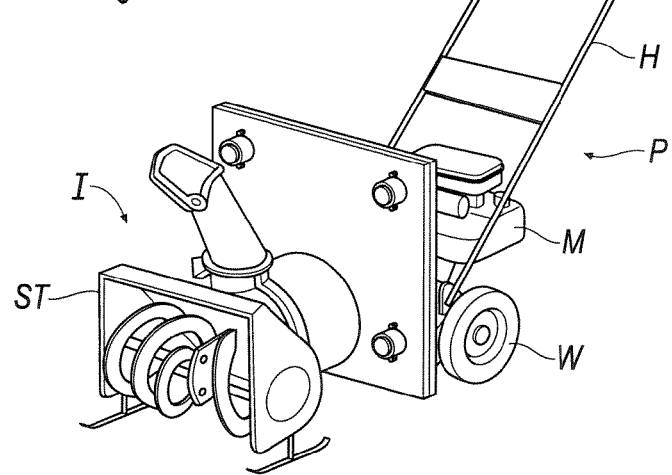
FIG. 4C is an isometric view of an assembly joined by way of a fastener in accordance with an exemplary embodiment of the invention.

Referring to FIGS. 4A-4C, a power unit, P, is defined to generally include an integral prime mover, M, and handle, H, that are supported by wheels, W. The implement, I, may include any desirable device including, for example, a lawn mower, L (FIG. 4A), a tiller, T (FIG. 4B), a snow thrower, ST (FIG. 4C), or the like.

Figure 5A:
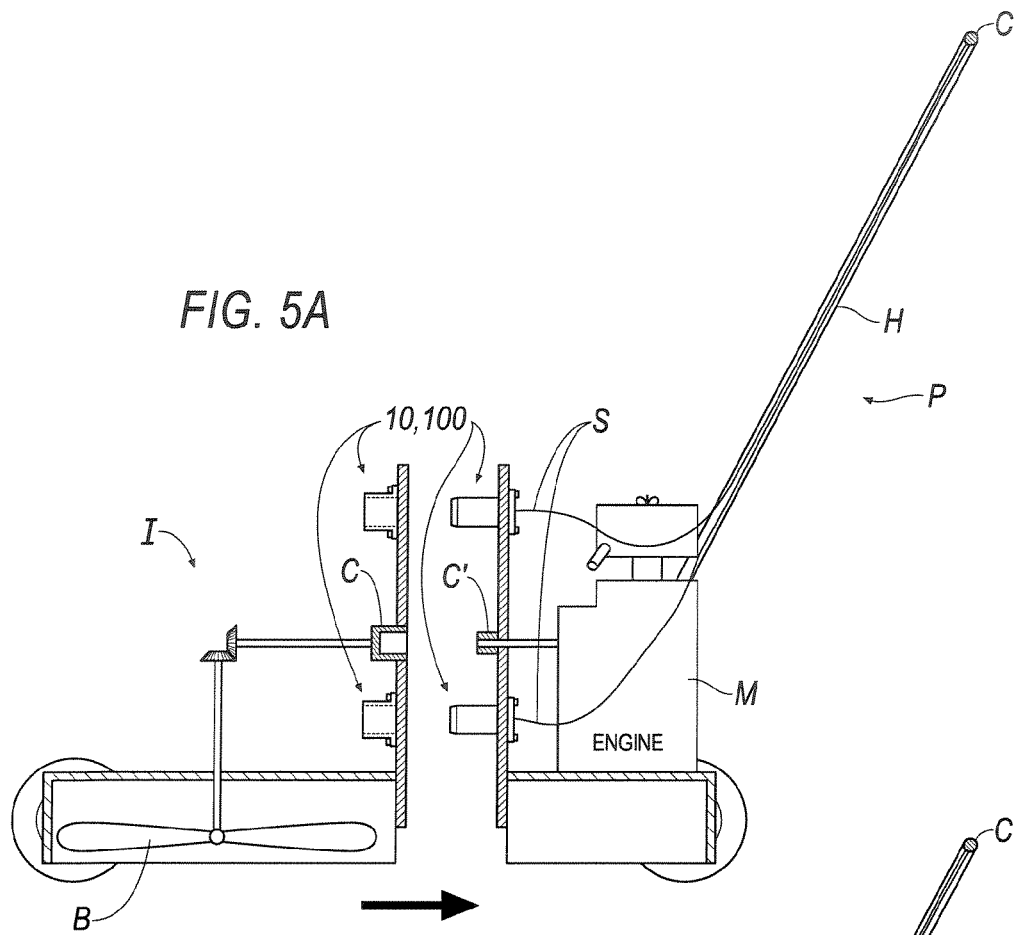
FIG. 5A is a cross-sectional view of the assembly of FIG. 4A in a disconnected state in accordance with an exemplary embodiment of the invention.
Figure 5B:
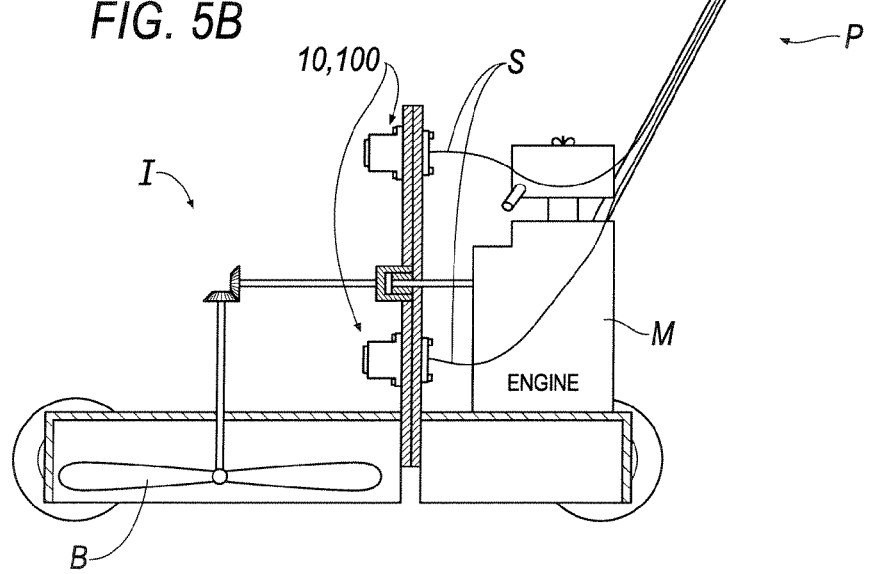
FIG. 5B is a cross-sectional view of the assembly in a connected state according to line 5B-5B of FIG. 4A.

As seen in FIGS. 5A and 5B, the prime mover, M, may be mechanically coupled to the implement, I, to drive a blade, B, working member, or the like of the implement, I. If desired, movement of the plunger 18, may be initiated through a controller, C, located on/proximate the handle, H. Accordingly, in an embodiment, such actuation of the controller, C, may pull/release the cable, S. In another embodiment, such actuation of the controller, C, may provide an electrical current to the solenoid 102. However, it will be appreciated that the controller, C, is not limited to pulling of the cable, S, or, the actuating of the solenoid 102 and that the controller, C, may interface with any desirable fastener design that results in the axial movement of the plunger 18.

Rotating coupler C, C' is comprised of a female portion C and a male portion C'. The coupler C, C' is rotatably supported by one or more rotatable bearings or the like (not shown) rendering both coupler halves C, C' free to rotate. Coupler C' is joined to a power output shaft driven by engine M and couples rotating energy from C' through C and ultimately to implement, I. Coupler halves C, C' have complementary geometries (such as C having a square female receptacle and C' shaped as a square male member adapted to be cooperatively received within square female receptacle C'). These complementary geometries allow couplers C, C' to operatively engage one another (i.e. transmit rotational power) when the implement, I is brought into contact with the power unit, P.

Referring to FIGS. 6-13, a fastener is shown generally at 200 according to an embodiment. As similarly described above with respect to the fastener 10, in an embodiment, the fastener 200 generally includes, for example, a housing 202, a plurality of retaining members 204, such as, for example, generally spherical retaining members 204, a cage 206, and a plunger 208. As will be explained in greater detail below, axial movement of the plunger 208 according to the direction of one of the arrows, X/X', along a longitudinal axis, A-A, results in radial movement of the retaining members 204 relative the axis, A-A, to effect interlocking (see, e.g., FIGS. 11-13) or unlocking (see, e.g., FIGS. 8-10) of the housing 202 and cage 206.

Figure 7:
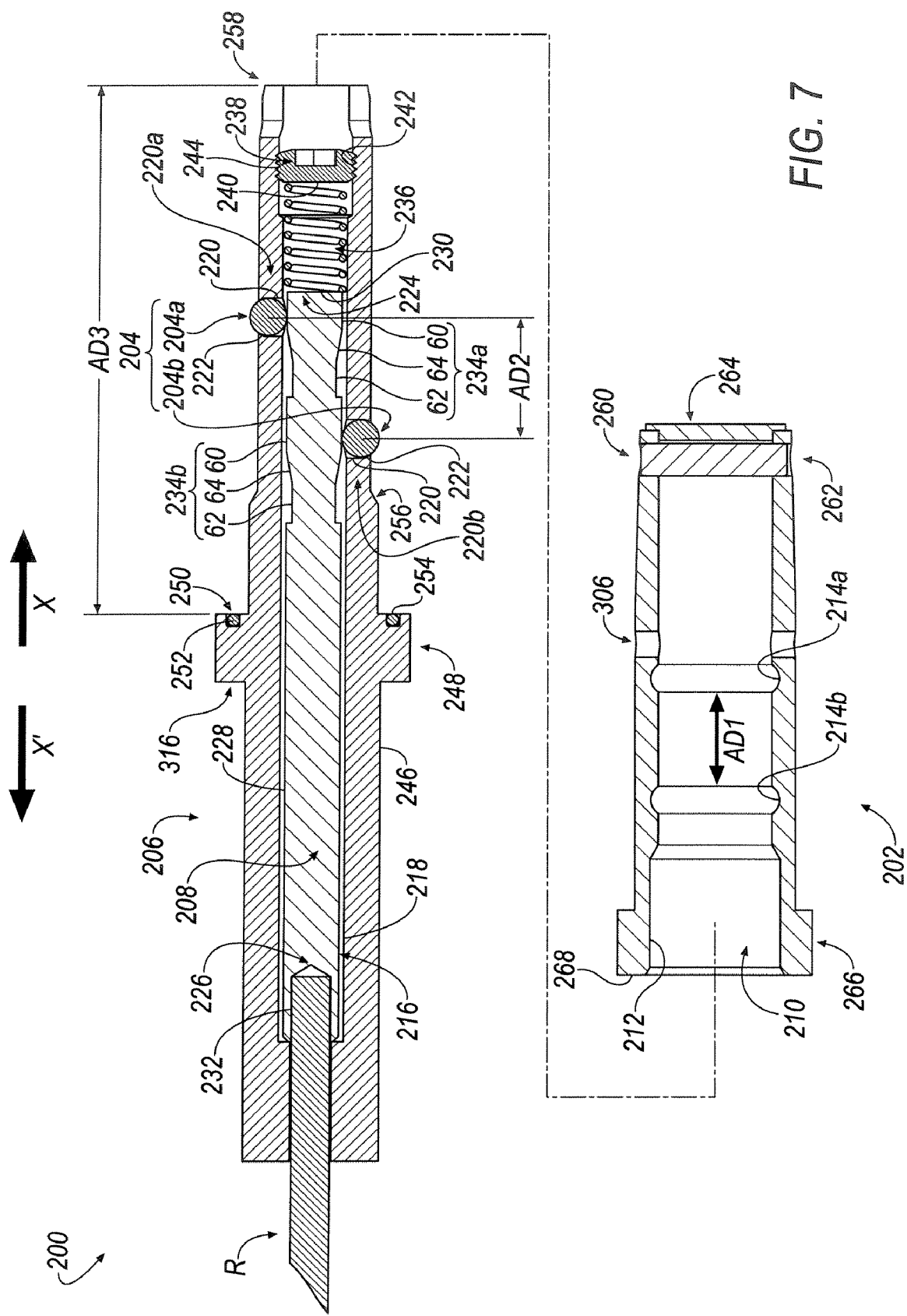
FIG. 7 is cross-sectional view of the fastener of FIG. 6 in a disconnected fully disengaged state in accordance with an exemplary embodiment of the invention.

Referring to FIG. 7, the housing 202 includes a cavity 210 for receiving at least a portion of the cage 206. The housing cavity 210 is generally defined by a substantially cylindrical bore formed by an inner surface 212. In an embodiment, the inner surface 212 forms a first annular recess 214a and a second annular recess 214b for partially receiving the plurality of retaining members 204. In an embodiment, the first and second annular recesses 214a, 214b are axially spaced apart from one another at an axial distance, AD1.

With further reference to FIG. 7, in an embodiment, the plurality of retaining members 204 of the fastener 200 are arranged in a first group 204a and a second group 204b. In an embodiment, an outer-most surface of each retaining member 204 of the first and second groups 204a, 204b of the retaining members 204 are also spaced apart at least by the axial distance, AD1.

Figure 8:
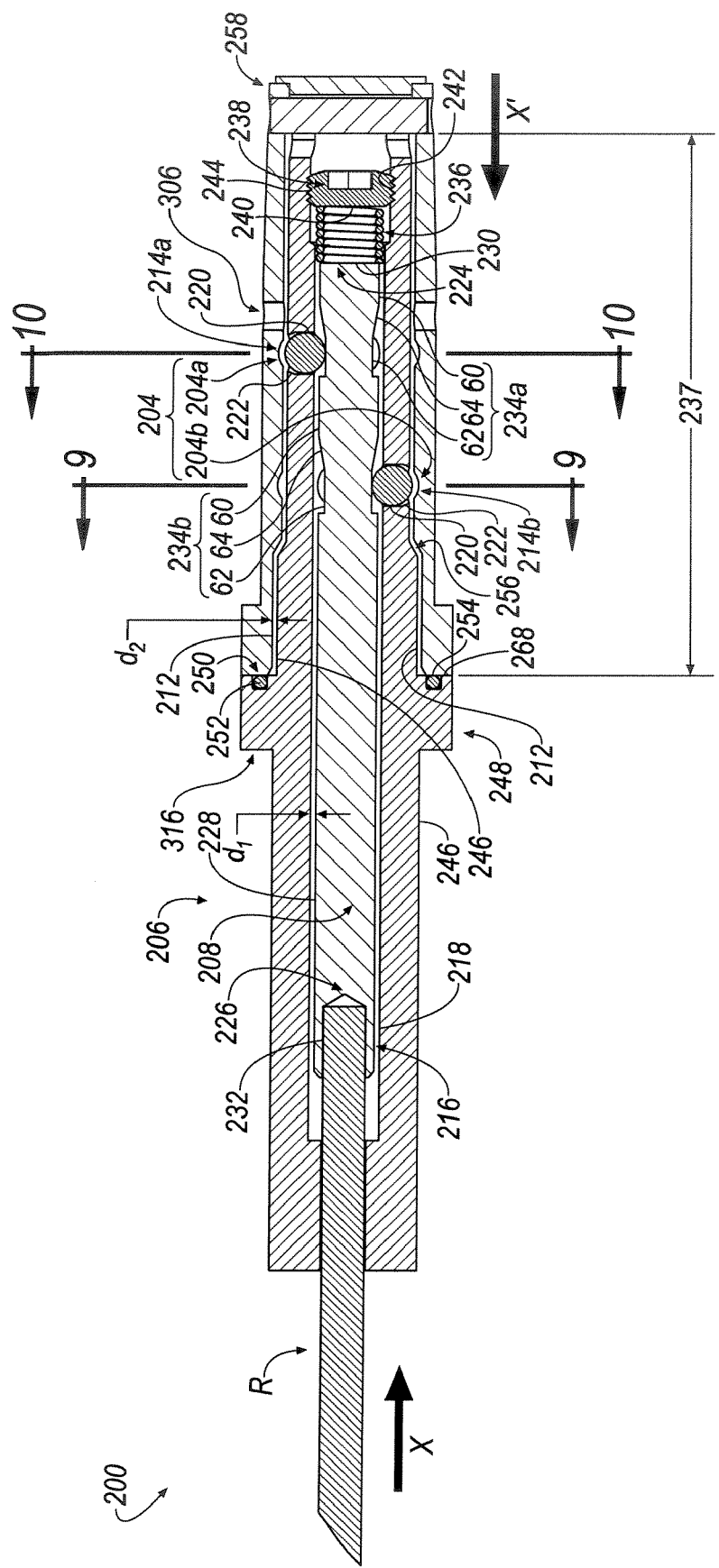
FIG. 8 is another cross sectional view of the fastener of FIG. 6 in a disconnected, partially disengaged state in accordance with an exemplary embodiment of the invention.
Figure 10:
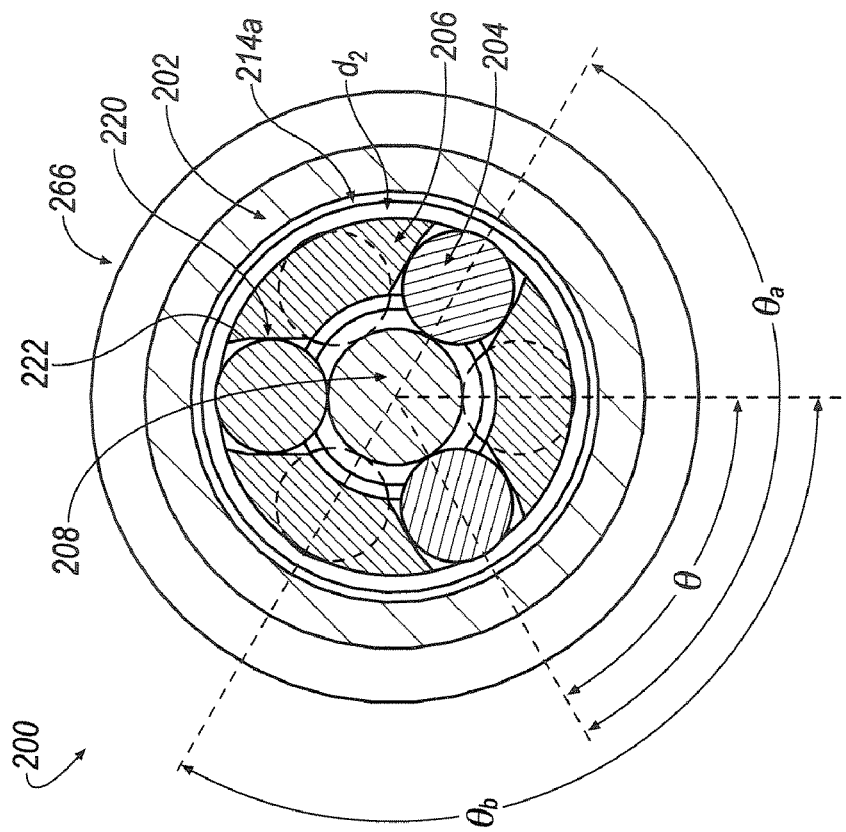
FIG. 10 is a cross-sectional view of the fastener of FIG. 8 according to line 10-10 in accordance with an exemplary embodiment of the invention.
Figure 11:
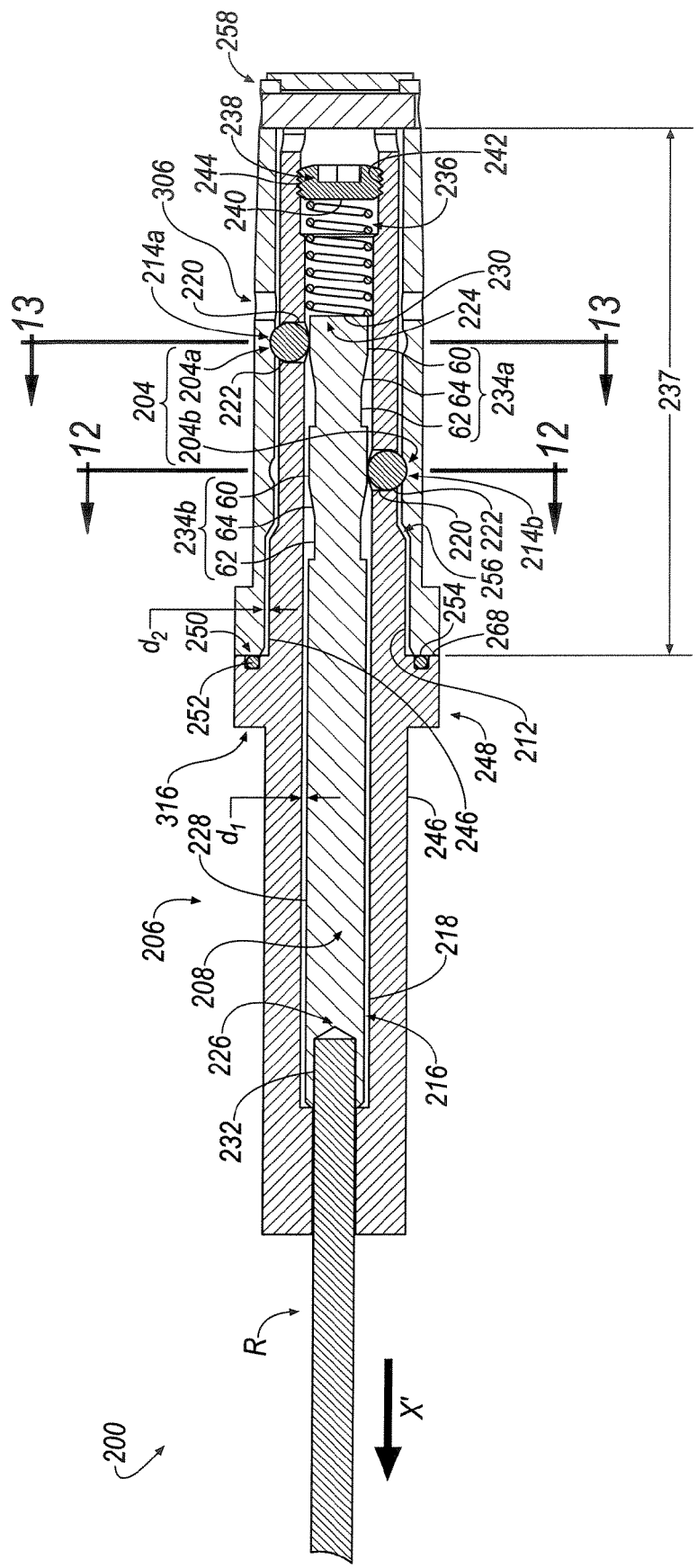
FIG. 11 is a cross-sectional view of the fastener of FIG. 6 in a connected, fully engaged state in accordance with an exemplary embodiment of the invention.

In an embodiment, when the cage 206 is inserted into the housing cavity 210, the first group 204a of the plurality of retaining members 204 corresponds to the first annular recess 214a (see, e.g., FIGS. 8, 11), and, the second group 204b of the plurality of retaining members 204 corresponds to the second annular recess 214b (see, e.g., FIGS. 8, 11). Further, in an embodiment, it will be appreciated that although FIGS. 6-13 depict each of the first and second groups 204a, 204b including three retaining members 204 (spaced apart from one another at an angle, $\theta_a$, $\theta_b$, approximately equal to 120° as shown in FIGS. 9-10 and 12-13), it is contemplated that each of the groups 204a, 204b may include more than three retaining members 204; for example, in an embodiment, each of the groups 204a, 204b may use four, five, six or more equally spaced retaining members 204 (i.e. spaced apart from one another at an angle, $\theta_a$, $\theta_b$, approximately equal to 90°, 72° or 60°) to further ensure that the cage 206 is rigidly centered within the housing cavity 210.

Referring to FIG. 7, the cage 206 may further include a cavity 216 for receiving at least a portion of the plunger 208. The cavity 216 is hereinafter referred to as a cage cavity 216. In an embodiment, the cage cavity 216 may be generally defined by a substantially cylindrical bore formed by a surface 218.

In an embodiment, the cage 206 may further include one or more passages, which are shown generally at 220, for partially receiving the plurality of retaining members 204. The passages 220 may include, at least in part, a radial passage component. In an embodiment, the one or more passages 220 may include retaining portions, which are shown generally at 222, for partially retaining the plurality of retaining members 204 proximate the one or more passages 220 when the cage 206 is removed from the housing cavity 210. Other means for retaining the retaining members 204 in the cage 206 are well known to those skilled in the art.

In an embodiment, the passages 220 are formed in the cage 206 to further define a first circumferential group of passages 220a and a second circumferential group of passages 220b that are spaced apart from one another according to the axial distance, AD1. In an embodiment, the first circumferential group of passages 220a are associated with the first group 204a of the plurality of retaining members 204 and the first annular recess 214a. In an embodiment, the second group of circumferential passages 220b are associated with the second group 204b of the plurality of retaining members 204 and the second annular recess 214b.

Once the first and second groups 204a, 204b of retaining members 204 are disposed within the first and second circumferential groups 220a, 220b of passages 220 and are spaced at least apart by the axial distance, AD1, a center of each retaining member 204 of the first group 204a are axially spaced from a center of each retaining member 204 of the second group 204b to define an axial distance, AD2, therebetween.

As will be explained in greater detail in the foregoing disclosure, the axial distance, AD2, permits the first and second groups 204a, 204b of the plurality of retaining members 204 to provide a pair a circumferential, axially spaced-apart bearing portions such that a gap/spacing may be formed (according to a radial distance, $d_2$, shown, for example, in FIG. 11) between the housing 202 and the cage 206. In an embodiment, the gap/spacing, $d_2$, results in an arrangement of an outer surface 246 of the cage 206 being disposed proximate, but not adjacent, the inner surface 212 of the housing cavity 210; as such, when the cage 206 is introduced into the housing 202, the outer-most surface of the plurality of retaining members 204 will bear substantially all of the load imparted to the fastener 200 such that substantially no load is transferred directly from/to the outer surface 246 of the cage 206 and the inner surface 212 of the housing cavity 210.

Referring to FIGS. 9-10 and 12-13, each passage 220 of the first circumferential group of passages 220a are angularly spaced apart from one another according to an angle, $\theta_a$, and, in an embodiment, each passage 220 of the second circumferential group of passages 220b are angularly spaced apart from one another according to an angle, $\theta_b$. As such, when the plurality of retaining members 204 are disposed within the passages 220, the plurality of retaining members 204 are angularly spaced apart according to the angles, $\theta_a$ and $\theta_b$, determined by each passage 220 of the first and second circumferential groups of passages 220a, 220b.

Figure 13:
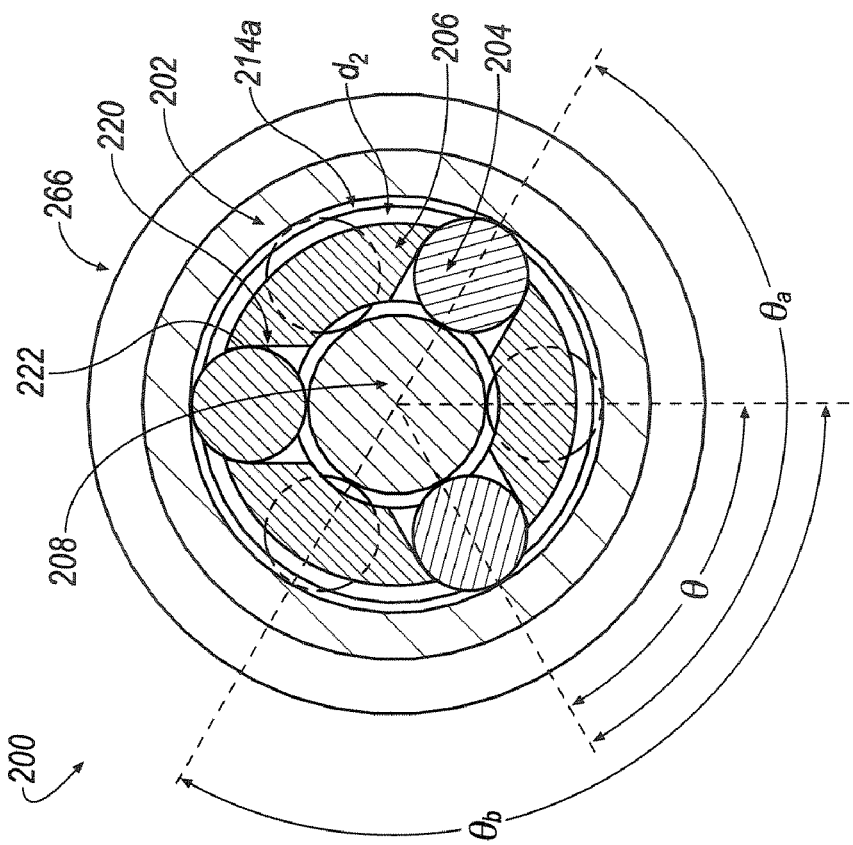
FIG. 13 is a cross-sectional view of the fastener of FIG. 11 according to line 13-13 in accordance with an exemplary embodiment of the invention.

Referring to FIGS. 10 and 13, it will be appreciated that the passages 220 of each of the first and second circumferential group of passages 220a, 220b may not necessarily be formed to include the same angularly spaced-apart orientation along the length of the cage 206. For example, in an embodiment, the angularly spaced-apart arrangement of the first circumferential group of passages 220a may be circumferentially offset from the second circumferential group of passages 220b by an angle approximately equal to, $\theta$.

In an embodiment, the angles, $\theta_a$ and $\theta_b$, may each be approximately equal to 1200, and, the angle, $\theta$, may be approximately equal to 600. Accordingly, because the illustrated embodiment of the cage 206 includes first and second circumferential groups of passages 220a, 220b that are offset by the angle, $\theta$, which may be approximately equal to one-half the angle defined by each of, $\theta_a$ and $\theta_b$, the plurality of retaining members 204 may provide substantially equal, but opposite support for the plunger 208 within the cage 206.

Figure 6:
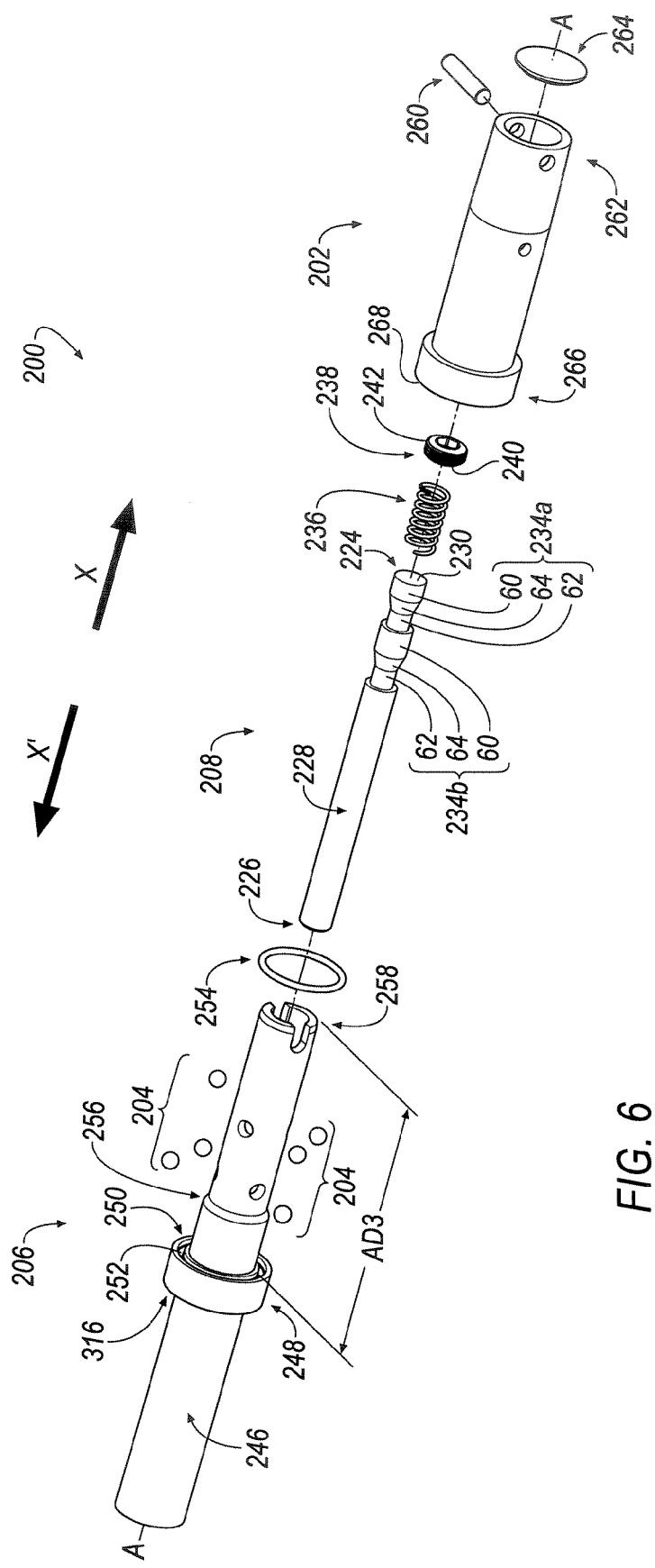
FIG. 6 is an exploded isometric view of a fastener in accordance with an exemplary embodiment of the invention.

Referring to FIGS. 6-7, the plunger 208 may include a substantially cylindrical body that is sized to be at least partially disposed within the cage cavity 216. In an embodiment, the plunger 208 may include a first axial end 224, a second axial end 226, and a side surface 228 between the first axial end 224 and the second axial end 226.

The first axial end 224 may further include an axial end surface 230. The second axial end 226 includes a passage 232 extending axially into the plunger 208. In an embodiment, passage 232 accommodates insertion of an actuator rod, R, into the plunger 208, which is described in greater detail in the foregoing disclosure.

With further reference to FIGS. 6-7, the side surface 228 of the plunger 208 is defined to include several surfaces 60-64 that are functionally similar to the surfaces 60-64 of the fastener 10 described above; as such, further description of the surfaces 60-64 associated with the fastener 200 are not described in greater detail here. However, it will be appreciated that the side surface 228 includes a first surface portion 234a and a second surface portion 234b each including the surfaces 60-64. In an embodiment, the first surface portion 234a is associated with the first group 204a of the plurality of retaining members 204, and, the second surface portion 234b is associated with the second group 204b of the plurality of retaining members 204.

In an embodiment, the axial end surface 230 functions as a reaction surface for an urging member 236. A portion of the urging member 236 may urge against the axial end surface 230. In an embodiment, the urging member 236 may be any known urging device, such as a coil spring, gas charged cylinder, compressible body (such as rubber) or the like.

Referring to FIGS. 6-7, the fastener 200 may further include a plug member 238. The plug member 238 may be at least partially disposed in the cage cavity 216 for retaining the plunger 208 and urging member 236 within the cage cavity 216. The plug member 238 includes an axial end surface 240 that provides a reaction surface for the urging member 236. In an embodiment, the plug member 238 may include an outer threaded surface 242 that threadingly-cooperates with a threaded surface 244 formed in the surface 218 of the cage cavity 216.

Upon disposing the retaining members 204, plunger 208, urging member 236 and plug member 238 into the cage 206, radial movement of the plurality of retaining members 204 may be provided by axially moving the plunger 208 within the cage cavity 216. In an embodiment, the plurality of retaining members 204 that are radially retained by the cage 206 will contact, at any given time, at least one of the first, second, and intermediate retaining member engagement surfaces 60-64, and, as described above with respect to the fastener 10, because of the differences in diameter and the frusto-conical shape of the axial segment of the plunger 208 as defined by the surfaces 60-64, the plurality of retaining members 204 may be radially displaced upon movement of the plunger 208 in one of the directions according to the arrows, X/X'.

In an embodiment, an outer surface 246 of the cage 206 further defines an annular portion 248 that circumscribes the cage 206. In an embodiment, the annular portion 248 includes a first shoulder surface 250 having a recess 252 that receives a seal 254. In an embodiment, the outer surface 246 further defines a ramp surface 256 that is spaced apart from the first shoulder surface 250. In an embodiment, the first shoulder surface 250 is spaced away from a first axial end 258 of the cage 206 at an axial distance, AD3.

In an embodiment, the housing 202 may further include a pin member 260 that passes through the housing 202 proximate a first axial end 262 of the housing 202. In an embodiment, the housing 202 may further include an end cap 264 disposed adjacent the first axial end 262 of the housing 202. In an embodiment, the housing cavity 210 may extend into the housing 202 from a second axial end 266 to the first axial end 262 proximate the pin member 260.

In an embodiment, the distance that the housing cavity 210 extends into the housing 202 may be approximately equal to the axial distance, AD3, between the first shoulder surface 250 and the first axial end 258 of the cage 206. Further, in an embodiment, the inner surface 212 that defines the housing cavity 210 generally corresponds to the outer surface 246 of the cage 206 between the first shoulder surface 250 and the first axial end 258 such that the outer surface 246 of the cage 206 is disposed proximate, but not adjacent (see, e.g., FIGS. 8, 11), the inner surface 212 of the housing cavity 210 as the first shoulder surface 250 is disposed adjacent an axial end surface 268 proximate the second axial end 266 of the housing 202.

Figure 9:
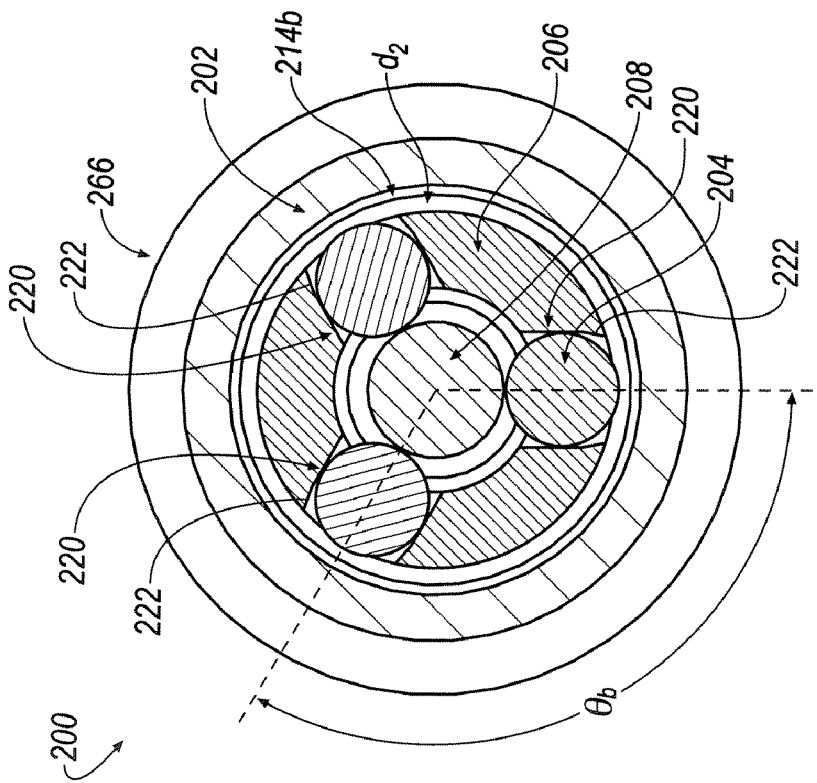
FIG. 9 is a cross-sectional view of the fastener of FIG. 8 according to line 9-9 in accordance with an exemplary embodiment of the invention.
Figure 12:
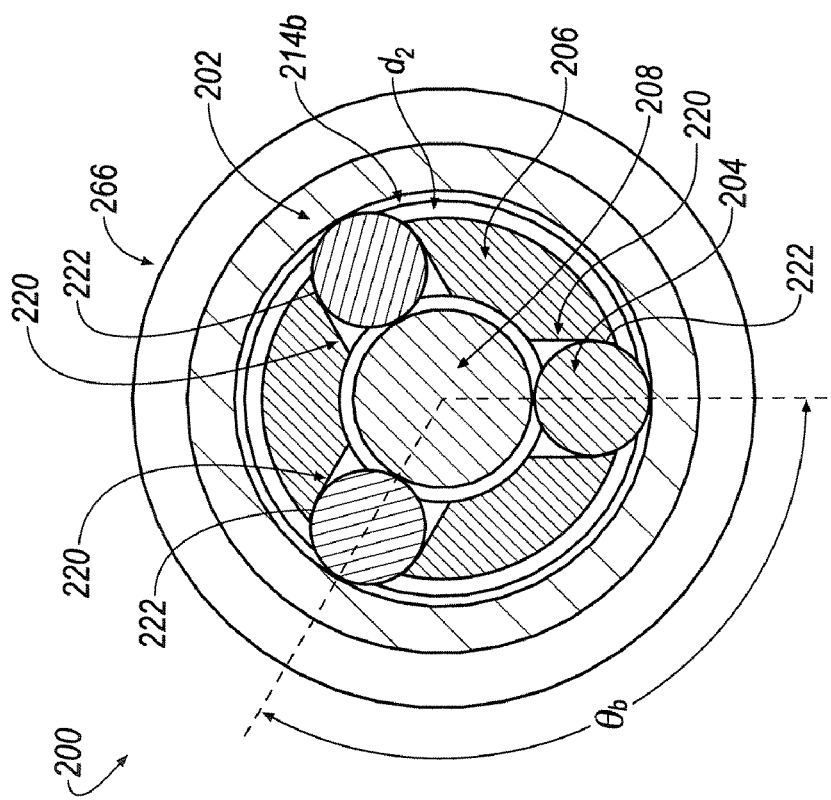
FIG. 12 is a cross-sectional view of the fastener of FIG. 11 according to line 12-12 in accordance with an exemplary embodiment of the invention.

Referring to FIGS. 8-10, the cage 206 is shown disposed within the housing cavity 210. Further, as seen in FIGS. 8-10, the actuator rod, R, has been moved according to the direction of the arrow, X, for compressing the urging member 236 while also permitting the plurality of retaining members 204 to move radially inwardly such that the plurality of retaining members 204 do not come into contact with or engage the first annular recess 214a and second annular recess 214b formed by the inner surface 212 of the housing 202; as such, the housing 202 and cage 206 are said to be in an unlocked or unlatched state/orientation. Conversely, as seen in FIGS. 11-13, the actuator rod, R, is released and/or the urging member 236 overcomes a bias applied to the actuator rod, R, such that the actuator rod, R, is moved according to the direction of the arrow, X', for causing the plurality of retaining members 204 to be moved radially outwardly such that the plurality of retaining members 204 come into contact with or engage the first annular recess 214a and second annular recess 214b formed by the inner surface 212 of the housing 202; as such, the housing 202 and cage 206 are said to be in a locked or latched state/orientation.

It will be appreciated that any of the fasteners 10, 100, 200 described herein may include three or more retaining members and openings as described above with respect to the retaining members 204 and openings 220. Further, it will be appreciated that the fasteners 10, 100, 200 may also be formed to define gap/spacing according to a radial distance, $d_1$, $d_2$ (see, e.g., FIGS. 8, 11), or the like between the plunger 208 and the cage 206 (see $d_1$) as well as the housing 202 and the cage 206 (see $d_2$).

In an embodiment, as described above, the radial distance, $d_2$, may be further characterized by a distance/spacing between the outer surface 246 of the cage 206 and the inner surface 212 of the housing cavity 210. $d_2$ may extend continuously along axial length 237 of cavity 210. $d_2$ may also extend continuously, angularly 360° (i.e. 0=360°). $d_2$ may assume a fixed distance along the axial length 237 or θ, or $d_2$ may vary (between upper and lower range limits) along the axial length 237 or θ. In an embodiment, the radial distance, $d_2$, may range anywhere between about 0.005 inches-0.500 inches. Alternatively, in an embodiment, the radial distance, $d_2$, may be approximately about equal to and range between about 0.015 inches-0.100 inches. Alternatively, in an embodiment, the radial distance, $d_2$, may range anywhere between about 0.020 inches-0.200 inches. Alternatively, in an embodiment, the radial distance, $d_2$, may range anywhere between about 0.050 inches-0.150 inches.

In an embodiment, the radial distance, $d_2$, may provide several advantages over a substantially tight/friction-fit connection of the cage 206 and the housing 202 that may otherwise permit contact/engagement of the outer surface 246 and the inner surface 212. For example, if one or more of the cage 206 and housing 202 includes material that may rust, the close tolerances associated with a tight/friction-fit connection may otherwise prevent the cage 206 to be inserted into the housing cavity 210. Further, if, for example, the fastener 200 is exposed to environments including dirt, dust, grime or other contaminates, trace amounts of the dirt, dust, grime or other contaminates located upon the outer surface 246 or inner surface 212 may interfere with insertion of the cage 206 into the housing cavity 210. Thus, it will be appreciated that the radial distance, $d_2$, may give rise to increasing the likelihood of ensuring a consistent and repeatable connection of the cage 206 and housing 202 by reducing the likelihood of the outer surface 246 engaging the inner surface 212.

Further, it will be appreciated that although the radial distance, $d_2$, provides several benefits described above, such benefits may not be realized without providing at least a pair of circumferential, axially spaced-apart bearing portions (realized by the axial distance, AD2, as defined by the first and second groups 204a, 204b of the plurality of retaining members 204). If, for example, the fastener 200 only included one of the first and second groups 204a, 204b, a degree of undesirable slop would be introduced about the housing 202 and cage 206. For example, if one wanted to design/provide a fastener 200 with the radial distance, $d_2$, while only providing one of the first and second groups 204a, 204b of the plurality of retaining members 204, the housing 202 would be permitted to (undesirably) slightly pivot (i.e. "teeter-totter") about cage 206 due to the fact that the one group 204a/204b would provide a single plane of circumferential bearing portion; as such, it will be appreciated that by providing at least a pair of circumferential, axially spaced-apart bearing portions, two spaced apart planes of support are established and any slop is minimized or eliminated, while also increasing the rigidity of the fastener 200. Thus, if the radial distance, $d_2$, is to be provided for the fastener 200, at least a pair of circumferential, axially spaced-apart bearing portions give distant functional advantages.

Figure 14A:
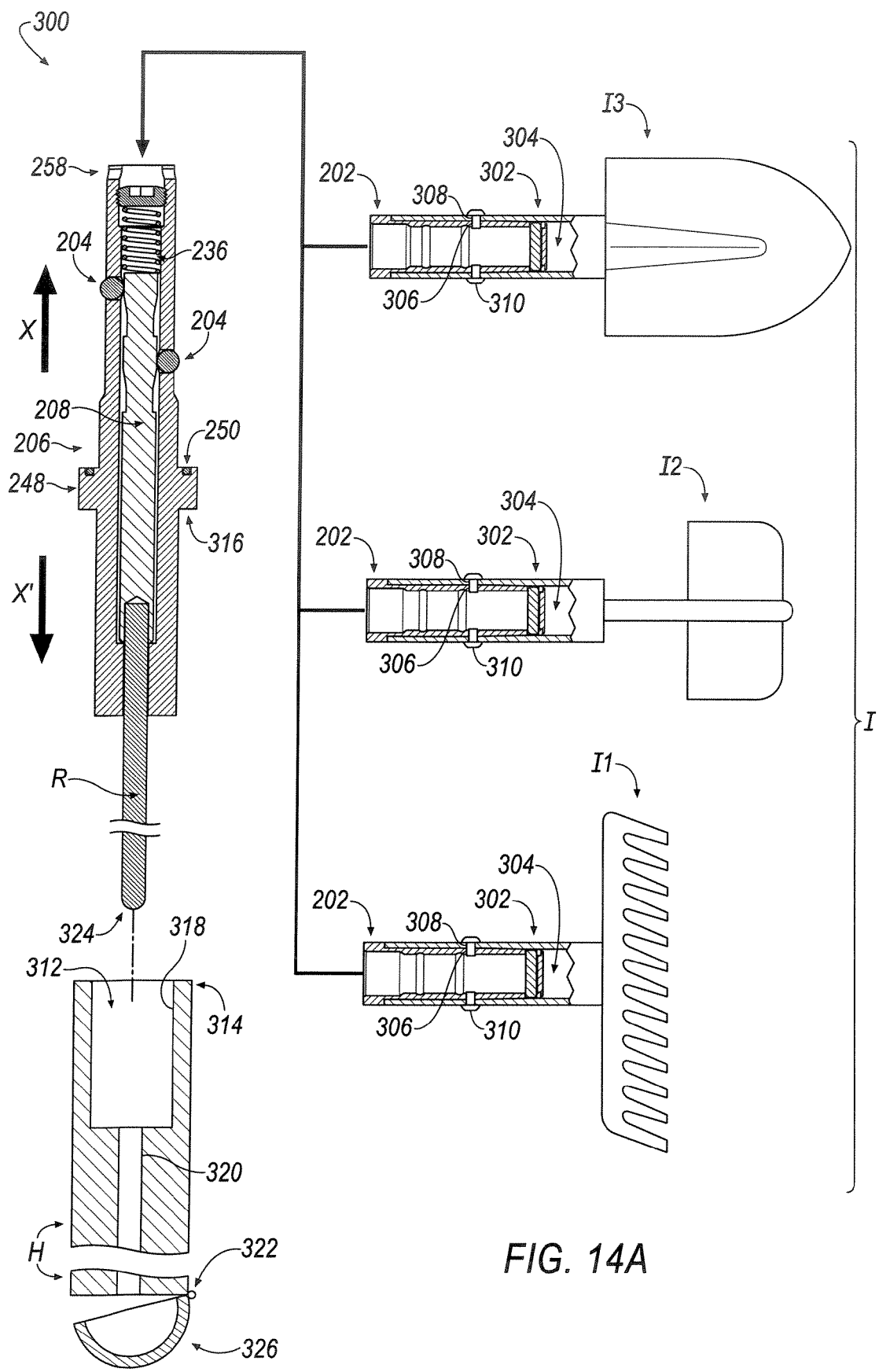
FIG. 14A illustrates a plurality of implements and a handle body each including a portion of the fastener of FIG. 6 in accordance with an exemplary embodiment of the invention.

Referring now to FIG. 14A, the fastener 200 is shown in conjunction with a tool-and-implement system, which is shown generally at 300 in accordance with an embodiment of the invention. In an embodiment, the "tool" of the implement system 300 includes a hand tool, and, in an embodiment, the hand tool includes a handle, which is shown generally at H. In an embodiment, the implement system 300 includes a plurality of implements, I, including implements I1-I3. In an embodiment, the fastener 200 is utilized to connect the handle, H, to one implement, I1-I3, of the plurality of implements, I.

In an embodiment, the implement, I1, includes a rake head. In an embodiment, the implement, I2, includes a hoe head. In an embodiment, the implement, I3, includes a shovel head. Although the three implements I1-I3 described above include a rake, hoe and shovel head, it will be appreciated that the plurality of implements, I, are not limited to include a rake, hoe and shovel head and that the plurality of implements, I, may include any desirable implement.

Further, it will be appreciated that the plurality of implements, I, are not limited to including garden/yard-work tool implements, I1-I3, and that the plurality of implements, I, may include any desirable feature, function or utility. In an embodiment, alternative implements may include painting implements, such as, for example, a roller brush.

It will also be appreciated that the plurality of implements, I, are also not limited to including work implements. For example, the plurality of implements, I, may be directed to sporting equipment. In an embodiment, if the plurality of implements, I, are directed to sporting equipment, the plurality of implements, I, may include, for example: a plurality of hockey stick blades each having a different curve (e.g., curves ranging from no curve up to a swooping curve for permitting a user to have selective control over the lofting capability of a puck from the ice surface). Alternatively, the plurality of implements, I, may include a plurality of lacrosse stick heads each having different weave patterns to the netting/shooting strings or the like (i.e., for controlling the direction of a ball as it is caught by/is shot out of the lacrosse stick head). As such, it will be appreciated that the plurality of implements, I, are not limited to include a particular implement, I, that is to be attached to the handle, H.

Further, it will be appreciated that although the plurality of implements, I, are shown as being capable of being attached to a handle, H, it will be appreciated that the "tool" of the implement system 300 is not limited to a hand tool, handle, H, or the like and that the "tool" may include any desirable body or the like that is not necessarily gripped with one's hand. In an embodiment, the "tool" portion of the implement system 300 may include, for example, a boot that may be fitted to one's foot, and, the implement may include, for example, a snow ski, snow board, or the like. As such, it will be appreciated that the "tool" is not limited, per se, to a handle, H, or the like and that the fastener 200 may be used to connect any desirable "tool" to any desirable implement, I.

As seen in FIG. 14A, each of the implements, I1-I3, includes a receptacle 302 having a cavity 304 for receiving the housing 202 of the fastener 200 therein. In an embodiment, each of the receptacle 302 and housing 202 includes radial passages 306, 308 that are aligned with one another. In an embodiment, a rivet 310 or the like is inserted into the radial passages 306, 308 for affixing the housing 202 with the receptacle 302. Although radial passages 306, 308 and a rivet 310 are shown for attaching the housing 202 with the receptacle 302, it will be appreciated that the attachment of the housing 202 and receptacle 302 is not limited to the above-discussed design and that the housing 202 and receptacle 302 may be attached by way of any desirable connection including, for example, a welded connection, adhesive or the like.

Referring to FIG. 14A, the handle, H, is shown relative the cage 206. In an embodiment, the handle, H, includes a cavity 312. In an embodiment, the cage 206 is inserted within the cavity 312 for joining the cage 206 to the handle, H; in an embodiment, the cage 206 may be joined to the handle, H, by any desirable method/means including, for example, adhesive, welding, a friction-fit connection or the like. In an embodiment, a first end 314 of the handle, H, is disposed adjacent a second shoulder surface 316 of the annular portion 248 upon fully disposing the cage 206 within the handle, H. In an embodiment, upon inserting the cage 206 within the handle, H, the outer surface 246 of the cage 206 is disposed adjacent an inner surface 318 defining the cavity 312.

As seen in FIG. 14A, the actuator rod, R, extends through bore 320 formed in the handle, H, and out of a second end 322 of the handle, H. In an embodiment, a portion of the actuator rod, R, that extends out of the second end 322 of the handle, H, may be referred to as a user-accessible end 324 of the actuator rod, R, for permitting a user to push the actuator rod, R, into the handle, H.

In an embodiment, when the user presses/engages the user-accessible end 324 and pushes the actuator rod, R, into the handle, H, the plunger 208 is moved according to the direction of the arrow, X, for compressing the urging member 236 while also permitting the retaining members 204 to be drawn radially inwardly. Further, when the user does not engage the user-accessible end 324/releases and pressure applied thereto, the urging member 236 may be positioned/returned to its expanded orientation such that plunger 208 is moved away from the first axial end 258 of the cage 206 such that the retaining members 204 are located in a radially-outward orientation.

Figure 14B:
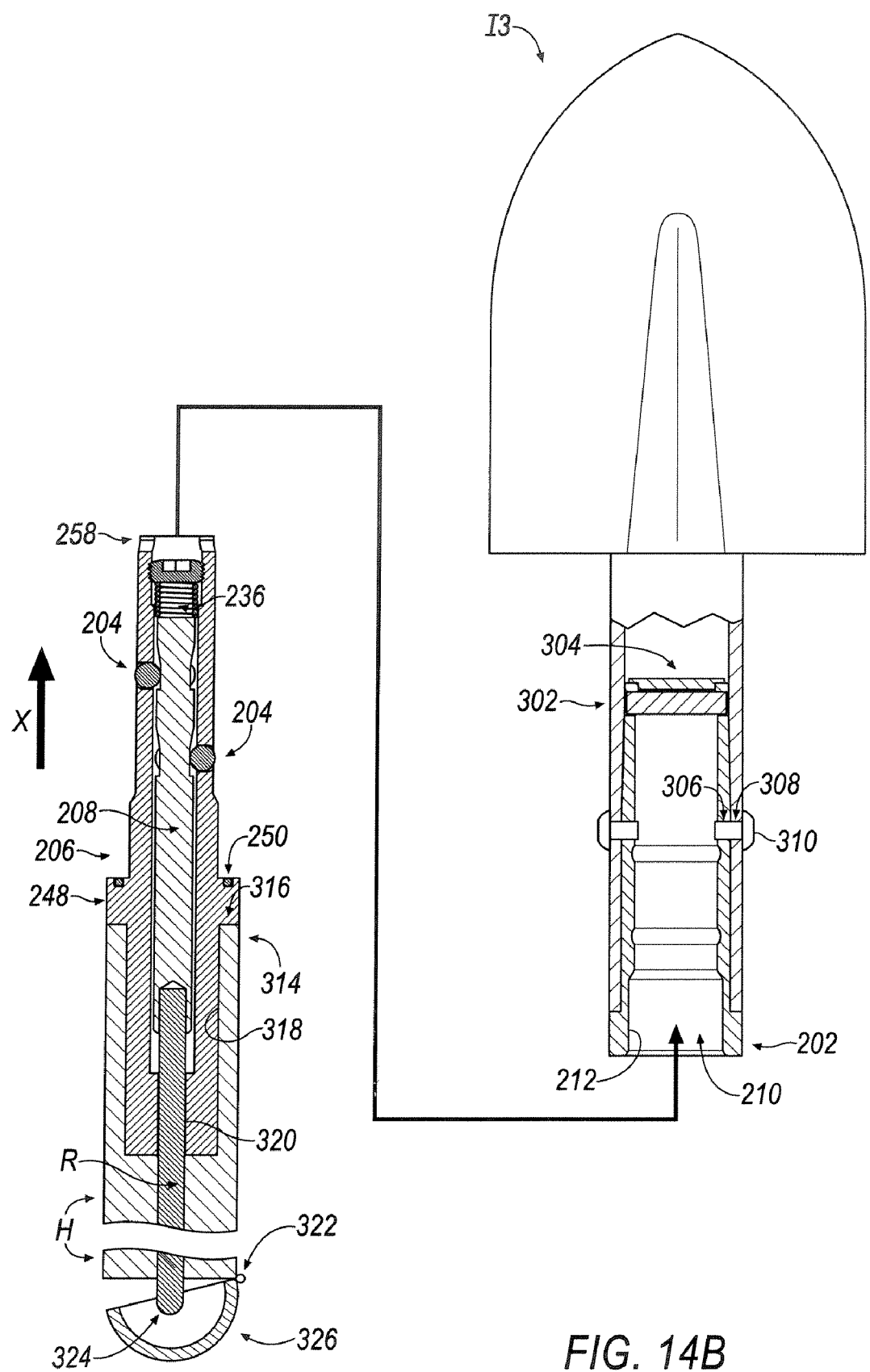
FIG. 14B illustrates one implement selected from the plurality of implements and the handle body of FIG. 14A.
Figure 1:
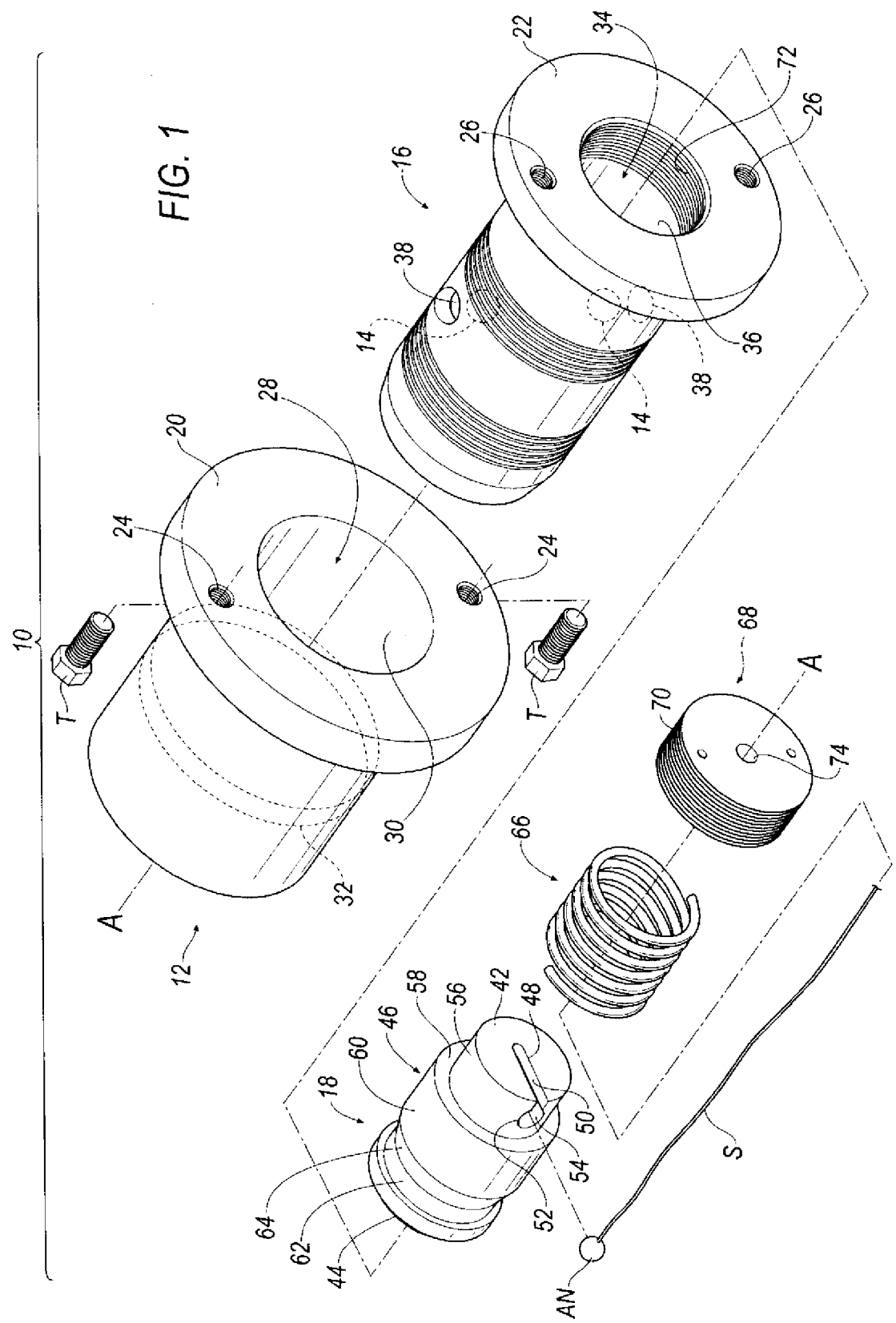
Figure 2A:
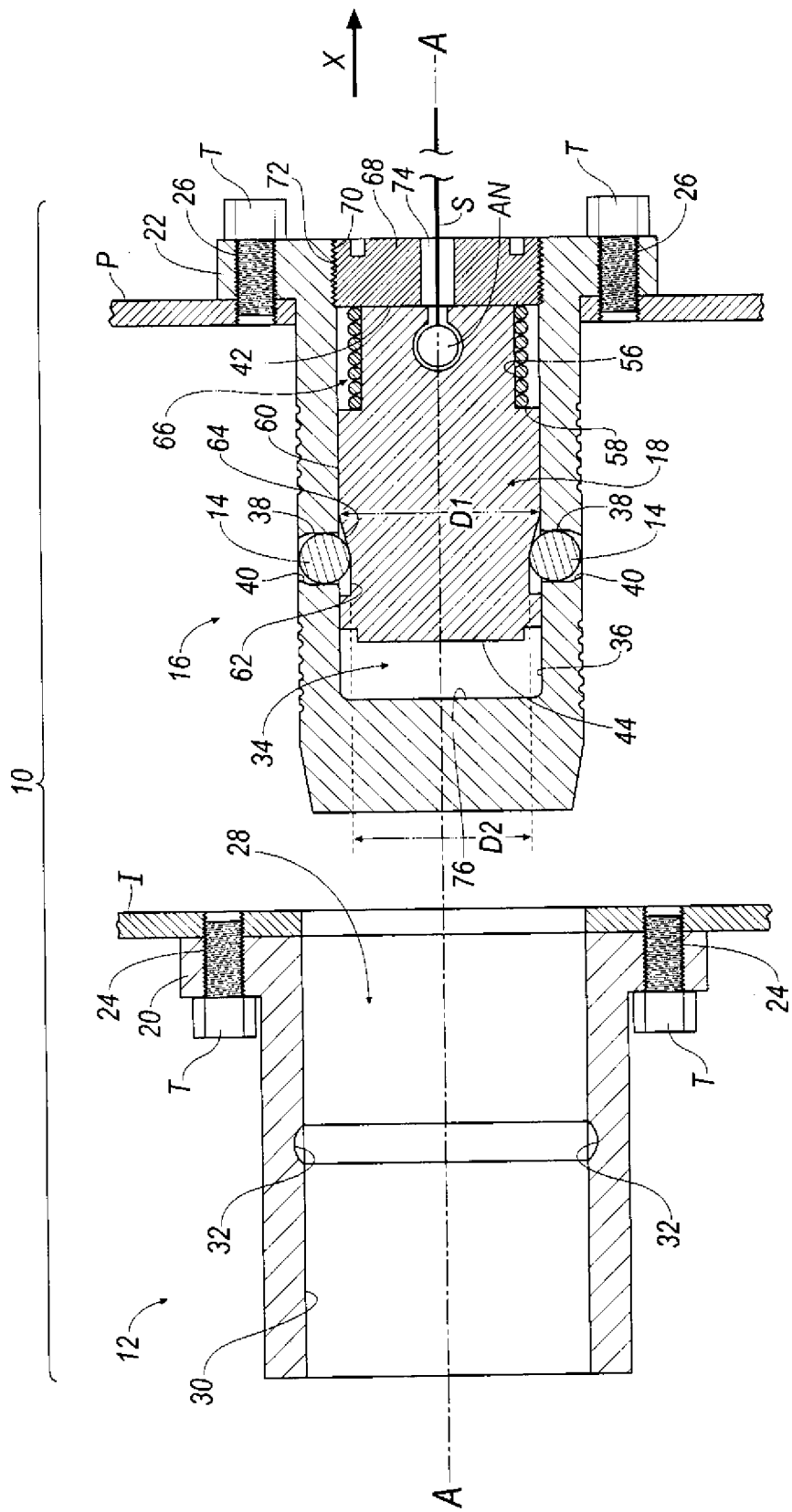
Figure 2B:
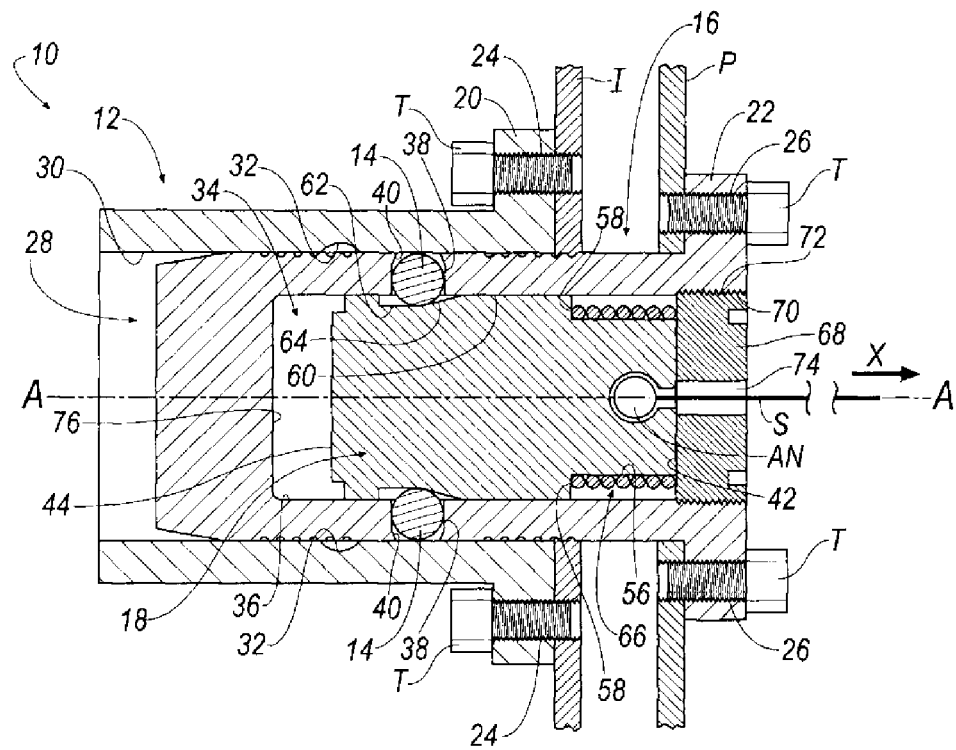
Figure 2C:
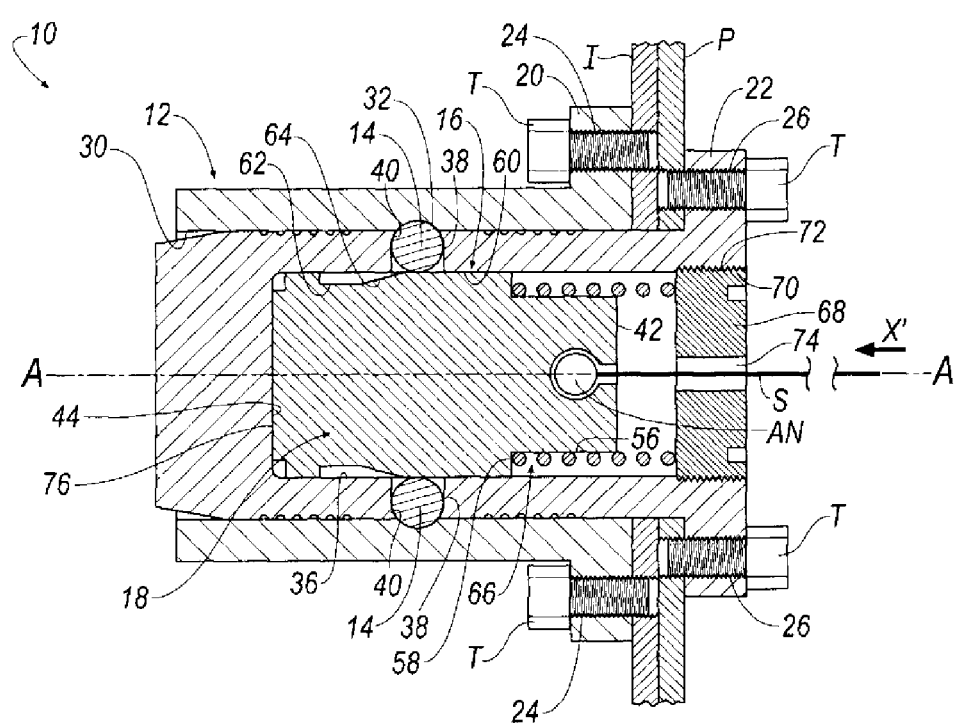
Figure 3A:
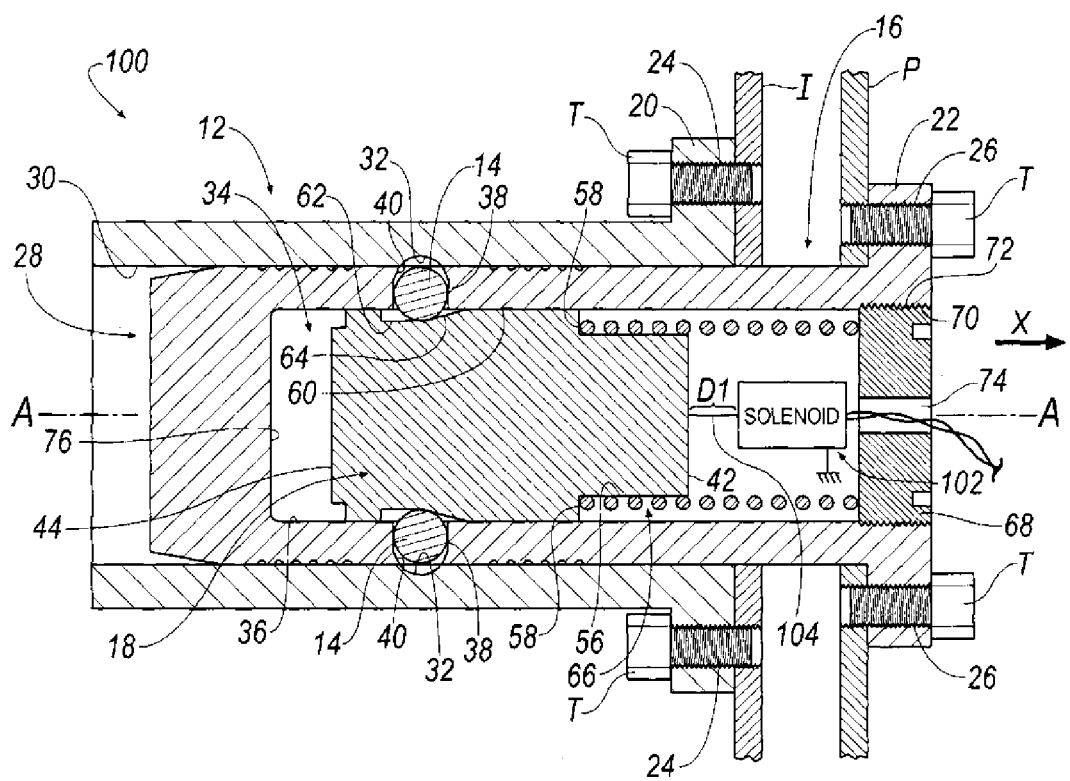
Figure 3B:
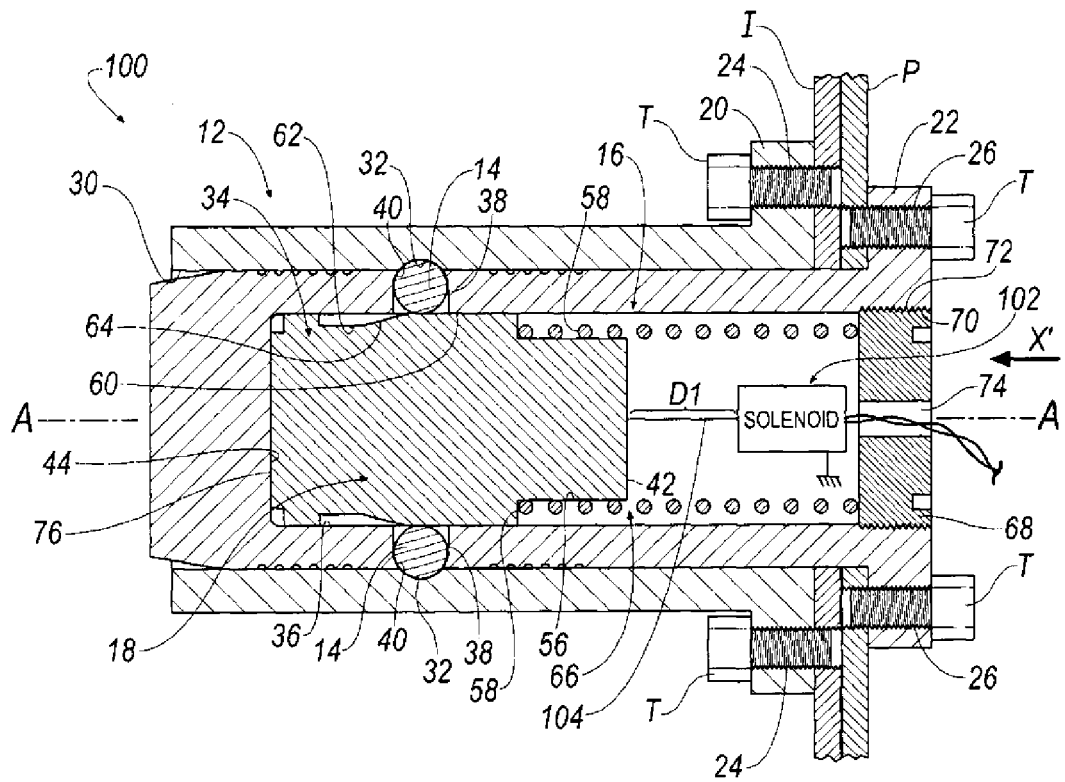

Referring to FIG. 14B, in an embodiment, a user may select the implement, I3, from the plurality of implements, I, for attachment to the handle, H. As shown in FIG. 14B, prior to insertion of the cage 206 into the housing cavity 210 for attaching the handle, H, to the implement, I3, the user engages and subsequently depresses the user-accessible end 324 of the actuator rod, R, for drawing the retaining members 204 radially inwardly.

With the retaining members 204 drawn radially inwardly, the cage 206 is inserted into the housing cavity 210 of the housing 202. Referring to FIG. 14C, once the cage 206 is inserted into the housing cavity 210, the user may no longer depress the user-accessible end 324 such that the urging member 236 may move the plunger 208 according to the direction of the arrow, X', thereby causing the retaining members 204 to move radially outwardly for locking/latching the cage 206 to the housing 202 as shown in FIG. 14D. Because the cage 206 is affixed to the handle, H, and, because the housing 202 is affixed to the implement, I3, it may be said that the implement, I3, is attached to the handle, H, according to the orientation of the retaining members 204 shown in FIG. 14D.

In order to detach the implement, I3, from the handle, H, the user may subsequently depress the user-accessible end 324 according to the direction of the arrow, X, to move the retaining members 204 radially inwardly as shown in FIG. 14C such that the implement, I3, may no longer be said to be locked/latched to the handle, H. The user may then attach one of the other implements, I1, I2, to the handle, H, as desired, once the cage 206 is withdrawn from within the housing cavity 210 associated with the implement, I3.

In an embodiment, the handle, H, may further comprise a cap, cover or the like, which is shown generally at 326. The cap 326 may be selectively placed over or attached to the second end 322 of the handle, H, in order to prevent undesirable contact with the user-accessible end 324 of the actuator rod, R, which may otherwise result in the unintended unlocking/unlatching of one of the plurality of implements, I, with the handle, H. Alternatively, rather than including a cap 326, the handle, H, may include other mechanical means (e.g., a safety lock) that impedes or prevents unintentional unlocking/unlatching of the handle, H, and the implement, I1-I3, when the user-accessible 324 is depressed.

The present invention has been described with reference to certain exemplary embodiments thereof. However, it will be readily apparent to those skilled in the art that it is possible to embody the invention in specific forms other than those of the exemplary embodiments described above. This may be done without departing from the spirit of the invention. The exemplary embodiments are merely illustrative and should not be considered restrictive in any way. The scope of the invention is defined by the appended claims and their equivalents, rather than by the preceding description.

What is claimed is:

1. A fastener, comprising:
    a housing, wherein the housing forms a housing cavity, wherein the housing cavity includes at least one recess;
    a cage at least partially disposed in said housing cavity, wherein an outer surface of the cage is spaced apart from an inner surface of the housing that forms the housing cavity, wherein the cage defines: a cage cavity, and a plurality of passages aligned with said at least one recess;
    a plurality of retaining members at least partially retained within said plurality of passages;
    a plunger including a distal end and a proximal end, wherein the plunger is at least partially disposed in said cage cavity;
    an end plug including a distal end, a proximal end and an outer threaded side surface, wherein the cage cavity includes an inner threaded surface, wherein the outer threaded side surface of the end plug threadingly engages the inner threaded surface of the cage cavity; and
    an urging member including a distal end and a proximal end, wherein the proximal end of the urging member is disposed directly adjacent the distal end of the plunger, wherein the distal end of the urging member is disposed directly adjacent the proximal end of the end plug, wherein the urging member is completely contained within the cage cavity, wherein said plunger is at least partially movable within said cage cavity between: a first position to cause said plurality of retaining members to be displaced radially outwardly thereby mechanically coupling said housing to said cage, and a second position to allow said plurality of retaining members to be displaced radially inwardly thereby allowing said housing to be uncoupled from said cage, wherein the at least one recess includes a first recess and a second recess that are spaced apart by an axial distance, wherein the plurality of passages includes a first circumferential group of passages and a second circumferential group of passages that are also spaced apart by the axial distance, wherein the plurality of retaining members includes a first group of retaining members and a second group of retaining members, wherein the first group of retaining members are disposed within the first circumferential group of passages, wherein the second group of retaining members are disposed within the second circumferential group of passages, wherein the first group of retaining members arranged within the first circumferential group of passages are aligned with the first recess for selective communication with the first recess, wherein the second group of retaining members arranged within the second circumferential group of passages are aligned with the second recess for selective communication with the second recess.

2. The fastener according to claim 1, wherein said plunger includes first and second side surfaces that are spaced apart by the axial distance between the distal end of the plunger and the proximal end of the plunger, wherein each side surface includes:
    a first retaining member engagement surface, wherein the first retaining member engagement surface defines a first axial segment of the plunger to have a first diameter,
    a second retaining member engagement surface, wherein the second ball engagement surface defines a second axial segment of the plunger to have a second diameter, wherein the second diameter is less than the first diameter, wherein contact of a corresponding one of the first group and the second group of retaining members with the first engagement surface results in the group of retaining members being displaced radially outwardly, wherein contact of the corresponding group of retaining members with the second engagement surface permits the group of retaining members to be displaced radially inwardly.

3. The fastener according to claim 2, wherein each said side surface includes an intermediate retaining member engagement surface between the first and second retaining member engagement surfaces, wherein the intermediate retaining member engagement surface defines a third axial segment of the plunger to have a frusto-conical shape.

4. The fastener according to claim 1, wherein the plunger is completely contained within the cage cavity.

5. The fastener according to claim 1, wherein the spaced apart relationship of the outer surface of the cage and the inner surface of the housing that forms the housing cavity provides means for ensuring a consistent and repeatable connection between the cage and the housing by reducing a likelihood that contaminates located therebetween will interfere with connecting the cage and the housing and of the outer surface of the cage engaging the inner surface of the housing.

6. The fastener according to claim 1, further comprising:
    an actuator rod attached to the plunger, wherein the actuator rod extends through a bore formed in the cage and out of the cage.

7. The fastener of claim 1, wherein the outer surface of the cage and the inner surface of the housing are spaced ($d_2$) between .005 inches and .500 inches.

8. The fastener of claim 1, wherein the outer surface of the cage and the inner surface of the housing are spaced ($d_2$) between .020 and .200 inches.

9. The fastener of claim 1, wherein the outer surface of the cage and the inner surface of the housing are spaced ($d_2$) between .050 and .150 inches.

10. The fastener of claim 1, wherein the spacing between the outer surface of the cage and the inner surface of the housing ranges anywhere between .005 inches and .500 inches continuously along an axial length of cavity.

11. The fastener of claim 10, wherein the spacing between the outer surface of the cage and the inner surface of the housing extends angularly continuously 360°.

12. The fastener according to claim 1, wherein each retaining member of each of the first and second groups of retaining members are angularly offset from one another at an angle, wherein the first group of retaining members are angularly offset from the second group of retaining members by an angle.

13. The fastener according to claim 1, wherein the housing is attached to an implement, wherein the cage is attached to a handle.

* * * * *

UNITED STATES PATENT AND TRADEMARK OFFICE
CERTIFICATE OF CORRECTION

PATENT NO.         : 8,251,606 B2                                              Page 1 of 5
APPLICATION NO.    : 12/511724
DATED              : August 28, 2012
INVENTOR(S)        : Bradley V. Blanchard It is certified that error appears in the above-identified patent and that said Letters Patent is hereby corrected as shown below:

In the Drawings

Delete Drawing Sheets 1-4 and substitute therefore with the attached Drawing Sheets 1-4 consisting of replacement FIGS. 1, 2A-2C, 3A, and 3B.

Signed and Sealed this
Thirtieth Day of September, 2014

Michelle K. Lee
*Deputy Director of the United States Patent and Trademark Office*